United States Patent [19]

Kubota et al.

[11] Patent Number: 5,469,272
[45] Date of Patent: Nov. 21, 1995

[54] DIGITAL SIGNAL RECORDING AND/OR REPRODUCING APPARATUS

[75] Inventors: Yukio Kubota; Takayuki Sasaki, both of Kanagawa; Takao Takahashi, Tokyo; Hiroshi Kobayashi, Chiba, all of Japan

[73] Assignee: Sony Corporation, Tokyo, Japan

[21] Appl. No.: 227,183

[22] Filed: Apr. 13, 1994

Related U.S. Application Data

[63] Continuation of Ser. No. 842,708, Feb. 27, 1992, abandoned.

[30] Foreign Application Priority Data

Mar. 5, 1991 [JP] Japan .................................. 3-062476

[51] Int. Cl.⁶ ................................................. H04N 5/76
[52] U.S. Cl. ........................... 358/335; 358/341; 360/32; 360/19.1
[58] Field of Search ................................... 358/335, 342, 358/341, 343, 310; 360/191, 32, 48, 27

[56] References Cited

U.S. PATENT DOCUMENTS

| | | | |
|---|---|---|---|
| 4,706,134 | 11/1987 | Jinguji | 358/343 |
| 4,816,928 | 3/1989 | Sasaki et al. | 358/343 |
| 4,819,059 | 4/1989 | Pape | 358/909 |
| 4,858,032 | 8/1989 | Okada et al. | 358/335 |
| 4,914,527 | 4/1990 | Asai et al. | 360/19.1 |
| 4,947,271 | 8/1990 | Nakayama et al. | 380/19.1 |
| 5,097,349 | 3/1992 | Nomura et al. | 358/335 |

FOREIGN PATENT DOCUMENTS

| | | |
|---|---|---|
| 0291028 | 11/1988 | European Pat. Off. . |
| 2080997 | 2/1982 | United Kingdom . |

*Primary Examiner*—Tommy P. Chin
*Assistant Examiner*—Huy Nguyen
*Attorney, Agent, or Firm*—William S. Frommer; Alvin Sinderbrand

[57] ABSTRACT

A still picture video signal processing unit 30 and a head unit 40 records video signals of a still picture imaged by a camera unit 10 and PCM audio signals from terminal 2 in a PCM audio area of a magnetic tape 1 as digital signals. A controlling unit 50 controls the still picture video signal processing unit 30 so that an ID for discriminating interchangeability or non-interchangeability of the digital signals may be stored in a predetermined area. During playback, the controlling unit 50 controls the processing unit 30 or the like so that the video signals, the PCM audio signals or the like may be reproduced based on the ID. The user may be informed as to if the recorded digital signals belong to the basic function having interchangeability or to the extension function not having interchangeability and as to the reason playback cannot be made. The producer may be free to add a unique function to make distinction from products of other producers as well as to develop products attractive to customers.

12 Claims, 14 Drawing Sheets

|   |   | ← 110 BLOCKS → |   |   |   |   |
|---|---|---|---|---|---|---|
| ← 45 BLOCKS → | | ← 20 BLOCKS → | | ← 45 BLOCKS → | | |
| 0 | 1 | 45 | 64 | 65 | 109 | ADDRESS |
| L 0U | L 2U | Q 4500 | Q 6400 | L 1U | L 89U | |
| L 0L | L 2L | Q 4501 | Q 6401 | L 1L | L 89L | |
| R 0U | R 2U | Q 4502 | Q 6402 | R 1U | R 89U | |
| R 0L | R 2L | Q 4503 | Q 6403 | R 1L | R 89L | |
| L 90U | L 92U | Q 4504 | Q 6404 | L 91U | L 179U | |
| L 90L | L 92L | Q 4505 | Q 6405 | L 91L | L 179L | |
| R 90U | R 92U | Q 4506 | Q 6406 | R 91U | R 179U | |
| R 90L | R 92L | Q 4507 | Q 6407 | R 91L | R 179L | 36 SYMBOLS |
| L 720U | L 722U | Q 4532 | Q 6432 | L 721U | L 809U | |
| L 720L | L 722L | Q 4533 | Q 6433 | L 721L | L 809L | |
| R 720U | R 722U | Q 4534 | Q 6434 | R 721U | R 809U | |
| R 720L | R 722L | Q 4535 | Q 6435 | R 721L | R 809L | |
| P 00 | P 10 | P 450 | P 640 | P 650 | P 1090 | |
| P 01 | P 11 | P 451 | P 641 | P 651 | P 1091 | 4 SYMBOLS |
| P 02 | P 12 | P 452 | P 642 | P 652 | P 1092 | |
| P 03 | P 13 | P 453 | P 643 | P 653 | P 1093 | |

FIG. 17

DIGITAL SIGNAL RECORDING AND/OR REPRODUCING APPARATUS

This application is a continuation of application Ser. No. 07/842,708, filed Feb. 27, 1992, abandoned.

BACKGROUND

1. Field of the Invention

This invention relates to a digital signal recording and/or reproducing apparatus, for example, to a digital signal recording and/or reproducing apparatus in which video signals, voice signals, data etc. are recorded as digital signals in a so-called PCM audio area of a magnetic tape employed in, for example, a so-called 8 mm video tape recorder, and in which recorded video signals, voce signals, data etc. are reproduced.

2. Prior Art

Among the apparatus for recording video signals, voice signals, computer data etc. on a recording medium, and reproducing the recorded video signals, voice signals, computer data etc., there are known a tape recorder for recording and/or reproducing mainly voice data, a video tape recorder for recording and/or reproducing mainly video data and a disc apparatus for recording and/or reproducing mainly computer data.

Specifically, in a 8 mm video tape recorder for recording and/or reproducing mainly video signals, referred to hereinafter as an 8 mm VTR, a magnetic tape 80 is wrapped around a so-called rotary head drum at an angle of 211°, and scanned helically by a pair of heads, referred to hereinafter as rotary heads, at an angular interval of 180°, for forming inclined tracks 81 on the magnetic tape 80, as shown in FIG. 13. In a video area 82 of each track 81, corresponding to rotation through 180° of a rotary head drum, frequency modulated luminance signals, carrier color signals converted to low frequency signals and frequency modulated audio signals are recorded in accordance with frequency multiplexing together with tracking signals for tracking servo, such as pilot signals for so-called ATF (automatic track finding) control. In the remaining area of each track 81, corresponding to rotation through 30° of the rotary head drum, that is a PCM audio area 83, non-linear quantized 8 bit/sample PCM audio signals are recorded after processing with so-called cross-interleaving encoding for error correction and appendage of synchronization signals, parity data and IDs. Along both sides of the magnetic tape 80, a cue track 84 and an audio track 85 are formed by scanning by stationary heads. Cue signals for locating or finding the addresses of the contents of recorded images are recorded in the cue track 84, while audio signals for after-recording, for example, are recorded in the audio track 85.

The format of the PCM audio area 83 is explained briefly.

With the NTSC system, there are recorded, in each track (corresponding to one field) of the PCM audio area, data of 1050 (=525/2×2 samples×2 channels: L0 to L524, R0 to R524) 8-bit words and 6 IDs, each consisting of 8 bits. Specifically, as shown in FIG. 14, each track of the PCM audio area is constituted by 132 (=(1050+6)/8) CRC (cyclic redundancy check) blocks. Turning to the format of each CRC block, 3-bit synchronization signals, 8-bit block address 8-bit Q-parity, 4-word data or ID, 8-bit Q-parity, 4-word data and 16-bit CRC code are arrayed in this order With the PAL system, the above figures are 1250 (=625/2×2 samples×2 channels : L0 to L624, R0 to R624) words/track and 157 (=(1250+6)/8)CRC block/track.

On the other hand, a video tape recorder having an increased frequency band for the video region, referred to hereinafter as Hi-8 mm VTR, has been marketed for improving the picture quality beyond the above mentioned 8 mm VTR, while researches are currently conducted for recording linearly quantized 16 bit/sample (or L mode) PCM audio signals or non-linearly quantized 12 bit/sample (or N mode) PCM audio signals in the PCM audio area for improving the sound quality.

The format of the PCM audio area, presently researched, is explained briefly.

On a magnetic track used in a Hi-8 mm VTR, inclined tracks are formed by helical scanning by the rotary head, similarly to the magnetic tape used for the above mentioned 8 mm VTR. In each track 91, corresponding to one field, there are recorded, from the leading end of the track, a margin area 94, a preamble area 95, a PCM audio area 93, a postamble area 96, a guard area 97 and a video area 92 for recording video signals, as shown in FIG. 15. The lengths of the margin area 94 and the preamble area 95, summed together, the lengths of the PCM audio area 93, postamble area 96 and the card area 97, summed together and the length of the video area 92, correspond to rotation through 5°, 36° and 180° of the rotary head drum, respectively.

Turning to a field format of the PCM audio area 93, for example, the NTSC system L mode, each track of the PCM audio area is constituted by 110 blocks, as shown in FIG. 16. In each block, a 4-symbol or byte header, 36-symbol data or Q-parity and 4-symbol P-parity are arrayed as shown. Specifically, the format of the 36-symbol data is such that, as shown in FIG. 17, 3240 (=36 bytes×90 blocks: $L_{0U}$ to $L_{809U}$, $L_{0L}$ to $L_{809L}$, $R_{0U}$ to $R_{809U}$, $R_{0L}$ to $L_{809L}$) byte data and 1160 (=4 bytes×110 blocks+36 bytes×20 blocks) byte parity are arrayed in each track.

The header format is such that, as shown in FIG. 18, synchronization signals, block address (BA), ID and the parity, each consisting of 8 bits, are arrayed. Meanwhile, with the PAL system, each track is composed of 132 blocks. Although the number of blocks in the N-mode is the same as that of the L-mode, the capacity of data recorded in each block is 27 symbols.

Meanwhile, although PCM audio signals are customarily recorded in the PCM audio area 82 of the 8 mm VTR or in the PCM audio area 92 of the Hi-8 mm VTR, it may be contemplated to use the 8 mm VTR or Hi-8 mm VTR not simply as an apparatus for recording and/or reproducing video signals, but as an apparatus for recording and/or reproducing various data, such as recording and/or reproducing video signals of a still picture or computer data as digital signals for enhancing the function or the usage of the apparatus.

However, in such case, the problem of interchangeability is raised to cause considerable inconveniences to users. For example, if a still picture is recorded using an 8 mm VTR having an additional function of recording video signals of a still picture as digital video signals in the PCM audio area and a magnetic tape on which the video signals of the still picture are recorded is to be reproduced by a conventional 8 mm VTR, the video signals of the still picture cannot be reproduced because the conventional 8 mm VTR is not provided with the function of reproducing the video signals of the still picture. Besides, the user is not apprised of the reason the digital signals recorded in the PCM audio area cannot be reproduced. On the other hand, computer data etc. recorded by a unique additional function developed by a producer cannot be reproduced by an 8 mm VTR produced by some other producer.

With recent enhancement of information, the kinds of the handled data, such as video signals, voice signals or computer data, are diversified. The kinds of data recorded and/or reproduced by digital signal recording and/or reproducing apparatus, such as 8 mm VTRs or Hi-8 mm VTRs, tend to be diversified, such that interchangeability cannot be maintained of data recorded by a function enhanced in future or a unique function developed by a producer.

OBJECTS AND SUMMARY OF THE INVENTION

In view of the above depicted status of the art, it is an object of the present invention to provide a digital signal recording and/or reproducing apparatus, such as an 8 mm VTR or a Hi-8 mm VTR, in which the format is such that digital signals recorded on the recording medium, such as a magnetic tape, by a function subject to interchangeability may be distinguished from those not subject to interchangeability, so that it would be easy for the producer to add a unique function(s) in future for distinction from other functions.

For accomplishing the above object, the present invention provides a digital signal recording apparatus comprising digital signal recording means for recording digital signals on a recording medium, identification code recording means for recording an identification code in a predetermined area of said recording medium, said identification code being adapted for discriminating a basic function having interchangeability from a dedicated function not having interchangeability, digital signal reproducing means for reproducing the digital signals recorded in said recording medium, identification code reproducing means for reproducing the identification code recorded in the predetermined recording area of the recording medium, and controlling means for discriminating if the digital signals reproduced by said digital signal reproducing means belong to the basic function or to the dedicated function based on the identification code from said identification code reproducing means.

The present invention also provides a digital signal recording and/or reproducing apparatus in which each track on a magnetic tape formed by helical scanning is divided into a first region and a second region, analog video signals are recorded in said first region, digital signals are recorded in said second region and the recorded analog video signals and digital signals are reproduced, said apparatus comprising digital signal recording means for recording video signals, voice signals and data as digital signals in said second region, identification code recording means for recording an identification code in a predetermined area of said recording medium, said identification code being adapted for discriminating a basic function having interchangeability from a dedicated function not having interchangeability, digital signal reproducing means for reproducing the digital signals recorded in said second region, identification code reproducing means for reproducing the identification code recorded in the predetermined recording area of the recording medium, and controlling means for discriminating if the digital signals reproduced by said digital signal reproducing means belong to the basic function or to the dedicated function based on the identification code from said identification code reproducing means.

BRIEF DESCRIPTION OF THE DRAWINGS

FIG. 2 is a diagrammatic view showing a time-space arrangement of pixel data for illustration of a field-to-field sampling principle;

FIG. 3 is a diagrammatic view showing a time-space arrangement of pixel data for illustration of an in-field sampling principle;

FIG. 17 shows a data format of a PCM audio area of the magnetic tape employed in the Hi-8 mm video tape recorder of FIG. 15.

DETAILED DESCRIPTION OF CERTAIN PREFERRED EMBODIMENTS

Figure 1:
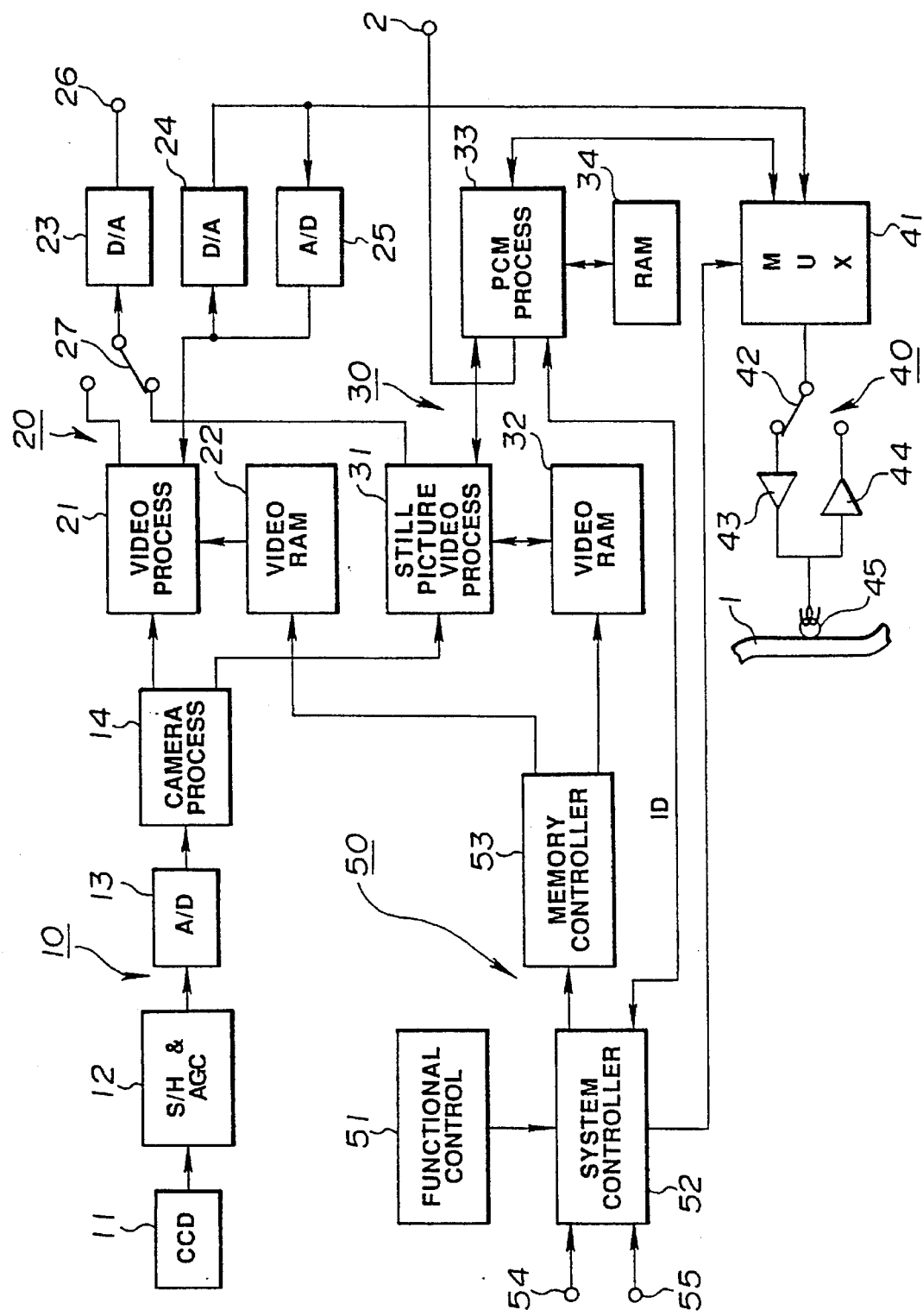
FIG. 1 is a block circuit diagram showing a circuit construction of an 8 mm video tape recorder with a built-in camera according to an embodiment of the present invention.

According to the present invention, when video signals, voice signals or data are recorded as digital signals in the second region of the magnetic tape, an identification code for discriminating if the recorded digital signals belong to the basic function having interchangeability or to the dedicated function not having interchangeability is recorded in a predetermined region of the magnetic tape. During playback, the video signals, voice signals and data are reproduced in a controlled manner based on the recorded identification code.

Referring to the drawings, preferred embodiments of a digital signal recording and/or reproducing apparatus according to the present invention will be explained in detail.

In a first embodiment, the present invention is applied to a 8 mm VTR with a built-in camera, referred to hereinafter simply as VTR. FIG. 1 shows the circuit arrangement of the VTR in a block circuit diagram.

Referring to FIG. 1, the VTR is constituted by a camera unit for photographing an object, a moving picture signal processing unit 20, a still picture video signal processing unit 30 for processing video signals of the still picture, a head unit 40 for recording video signals of a moving picture as analog video signals in a video area of a magnetic tape 1 and recording video signals of the still picture and voice signals as digital signals in a PCM audio area of the magnetic tape 1 as well as reproducing the recorded signals, and a controlling unit 50 for controlling the units 20, 30 and 40 based on functions set in a manner which will be explained subsequently.

The camera unit 10 is adapted for converting imaging signals into digital signals and processing the produced digital video signals with knee or gamma processing before transmitting the signals to the units 20 and 30. The camera unit 10 is constituted by a CCD image sensor 11, referred to hereinafter as a CCD, a S/H and AGC circuit 12 for sampling the imaging signals from CCD 11 at a predetermined period and processing the sampled signals with automatic gain control (AGC), an A/D converter 13 for converting the sampled video signals from the S/H and AGC circuit 12 into digital signals and a camera processing circuit 14 for processing the digital video signals with knee and gamma processing.

The moving picture video signal processing unit 20 is adapted for converting the digital video signals from the camera unit 10 into analog video signals for supplying the converted signals and for reproducing analog video signals conforming to e.g. NTSC system from reproduced RF signals from the head unit 40. The moving picture video signal processing unit 20 is constituted by a video RAM 22 for sequentially storing video signals from the camera processing circuit 14 or from the head unit 40, a video processing circuit 21 for converting video signals read from video RAM 22 based on addresses from the controlling unit 50 into video signals conforming to the NTSC system, frequency modulating luminance signals by a predetermined carrier wave, converting the carrier color signals into low frequency signals, frequency multiplexing the converted low frequency signals to produce frequency multiplexed signals, referred to hereinafter as moving picture data, transmitting the moving picture data to head unit 40 and reproducing video signals from the moving picture data by a reverse process, a D/A converter 23 for converting digital video signals, supplied from the video processing circuit 21 or the still picture video signal processing unit 30 via changeover switch 27 into analog signals, and an A/D converter 25 for converting analog video signals obtained as playback RF signals from the head unit 40 into moving picture data and transmitting the moving picture data thus produced to the video processing unit 21.

The still picture video signal processing unit 30 is adapted for compressing one-field or one-frame data of digital video signals from the camera unit 10 as the occasion may demand and supplying the compressed data to the head unit 40 while reproducing digital video signals from playback RF signals from the head unit 40. The still picture video signal processing unit 30 is constituted by a video RAM 32 for storing one-field data or one-frame data of the video signals from the camera processing circuit 14 or from the head unit 40, a still picture video processing circuit 31 for compressing video signals read from video RAM 32 based on addresses from the controlling unit 50 as the occasion may demand to produce compressed video data, referred to hereinafter as compressed data, and expanding the compressed data by a reverse process for reproducing video signals, a RAM 34 for transiently storing compressed data from the circuit 31 or from the head unit 40, and a PCM processing circuit 33 for appending synchronizing signals, error correction signals and IDs corresponding to the functions set by the controlling unit 50 to the compressed data read from RAM 34 and processing the still picture data by error correction by a reverse process while detecting the IDs from the still picture data for supplying the detected IDs to the control circuit 50. The compressed data with the IDs etc. appended thereto are referred to hereinafter as still picture data.

Meanwhile, the above mentioned predetermined data compressing operation means a combination of adaptive dynamic range coding which takes advantage of a strong correlation of the video signals in time space and subsampling which samples video data.

The adaptive dynamic range coding and subsampling will be hereinafter explained.

In the adaptive dynamic range coding, pixel data are arranged into blocks, each pixel data $X_t$ in each block is converted by the formula given below, and data compression is effected using the compressed data $Q_t$ and a dynamic range DR and a minimum value MIN which are attribute data of the block. Each pixel data $Y_t$ is obtained in accordance with the following formula.

$$DR = MAX - MIN$$

$$Q_t = ((X_t - MIN) \times (2^N - 1))/DR$$

$$Y_t = (DR/2^N - 1) \times Q_t + MIN$$

$X_t$ = t'th original signal data $Q_t$ = t'th compressed data

DR = dynamic range

N = number of quantization bits after compression

MAX = maximum value in a block

MIN = minimum value in a block

Figures 2, 3:
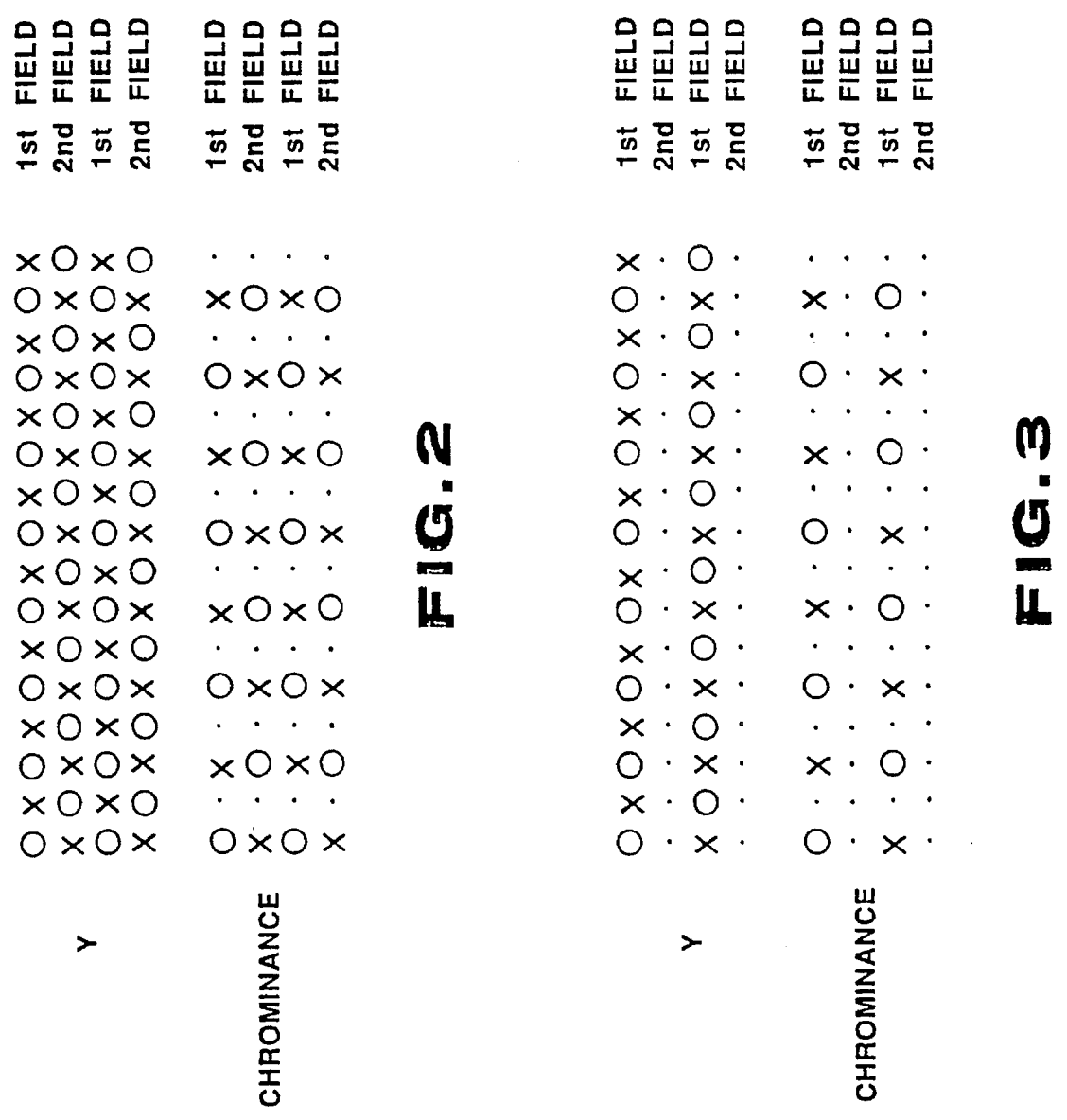

In subsampling, when the video signals of the still picture are recorded on the frame-by-frame basis, every other data of pixel data of luminance signals and chrominance signals are eliminated at different positions from frame to frame by field-to-field offset subsampling, as shown in FIG. 2, by way of effecting data compression. The eliminated data are shown by x. On the other hand, when the video signals of the still picture are recorded on the field-by-field basis, every other data of pixel data of luminance signals and chrominance signals are eliminated at different positions between adjacent lines by in-field offset subsampling, as shown in FIG. 3, by way of effecting data compression. The eliminated data are shown by x. There is no particular limitation as to so-called pre-filter or a post-filter.

It is now assumed that the sampling frequency is 910 times or 1365 times the frequency of horizontal synchronization signals, referred to hereinafter as 910 fH or 1365 fH, respectively, the pixel data produced by these sampling operations are so-called 4:2:2 component signals, and the luminance signals (Y) and chrominance signals (R-Y, B-Y) are 8-bit signals. If, for example, the sampling frequency is 910 fH and the system is NTSC system, the number of samples per line is 768 for luminance signals and 384×2 for chrominance signals, with the number of lines per frame being 484, as shown in Table 1. On the other hand, if the sampling frequency is 910 fH and the system is PAL system, the number of samples per line is 752 for luminance signals and 378×2 for chrominance signals, with the number of lines per frame being 576, as also shown in Table 1.

TABLE 1

|  |  | NTSC | PAL |
|---|---|---|---|
| Sample/line | Y | 768 | 752 |
|  | chrominance | 384 × 2 | 376 × 2 |
| line/frame |  | 484 | 576 |

If such pixel data are processed by the above mentioned data compression for recording on a PCM audio area of the magnetic tape 1, the time necessary for recording per each still picture is diminished significantly when data are compressed than when data are not compressed. Specifically, in the case of frame recording, for example, the time necessary for recording is 11.8 sec for non-compressed data and 2.6 sec for compressed data. Meanwhile, the values for the Hi-8 PCM VTR, as later explained, are also shown in Table 2.

TABLE 2

| Sampling Frequency | Hand Compression System | Field or Frame | Time required for recording (sec) | | Compression Ratio (%) |
|---|---|---|---|---|---|
| | | | 8bit PCM | Hi-8 PCM | |
| 910fH | Non- | Frame | 11.8 | 3.8 | 100.0 |
| mode | Compression | Field | 5.9 | 1.9 | 100.0 |
| (corresp. | ADRC | Frame | 2.6 | 0.8 | 21.9 |
| to 4 fSC) | Sub-Sampling | Field | 1.7 | 0.5 | 28.2 |
| 1365fH | Non- | Frame | 17.7 | 5.7 | 100.0 |
| mode | Compression | Field | 8.9 | 2.9 | 100.0 |
| (corresp. | ADRC | Frame | 3.9 | 1.3 | 21.9 |
| to 6 fSC) | Sub-Sampling | Field | 2.5 | 0.8 | 28.2 |

The head unit 40 is adapted for time divisionally multiplexing digital video signals from the still picture video signal processing unit 30, PCM audio signals or computer data transmitted via terminal 2, such as computer graphics data, and analog video signals from the moving picture video signal processing unit 20, for recording in the PCM audio area and video area of the magnetic tape 1, while reproducing these signals. The head unit 40 is constituted by a MUX 41 for selecting one of digital signals supplied via terminal 2 or digital video signals (still picture data) from the PCM processing circuit 33 and time divisionally multiplexing the selected digital signals and analog video signals from D/A converter 24, that is analog video signals converted from moving picture data, an amplifier 43 for amplifying the time divisionally multiplexed recording signals from MUX 41, another amplifier 44 for amplifying reproduced RF signals, a changeover switch 42 for switching between the amplifiers 43 and 44 at the time of recording an reproduction, and a pair of heads, referred to hereinafter as CH1 head and CH2 head. Each of these heads is constituted by a rotary head 45 for recording signals on the magnetic tape 1 based on the exciting current from amplifier 43 and reproducing playback RF signals for supplying the reproduced signals to amplifier 44.

The controlling unit 50 is constituted by a function controlling circuit 51 for setting a variety of operating modes for the VTR, such as still picture imaging/playback mode, moving picture imaging/playback mode, PCM audio signal recording/playback mode, such as recording/playback mode for e.g. computer graphics data, a system controller 52 for controlling the various parts based on control signals associated with the operating modes as set by the function controlling circuit 51 and IDs from the PCM processing circuit 33 and transmitting the IDs as later explained to the PCM processing circuit 33 in association with the set mode, and a memory controller 53 for controlling addresses to the video RAMs 2, 32 under control of the system controller 52.

Figure 13:
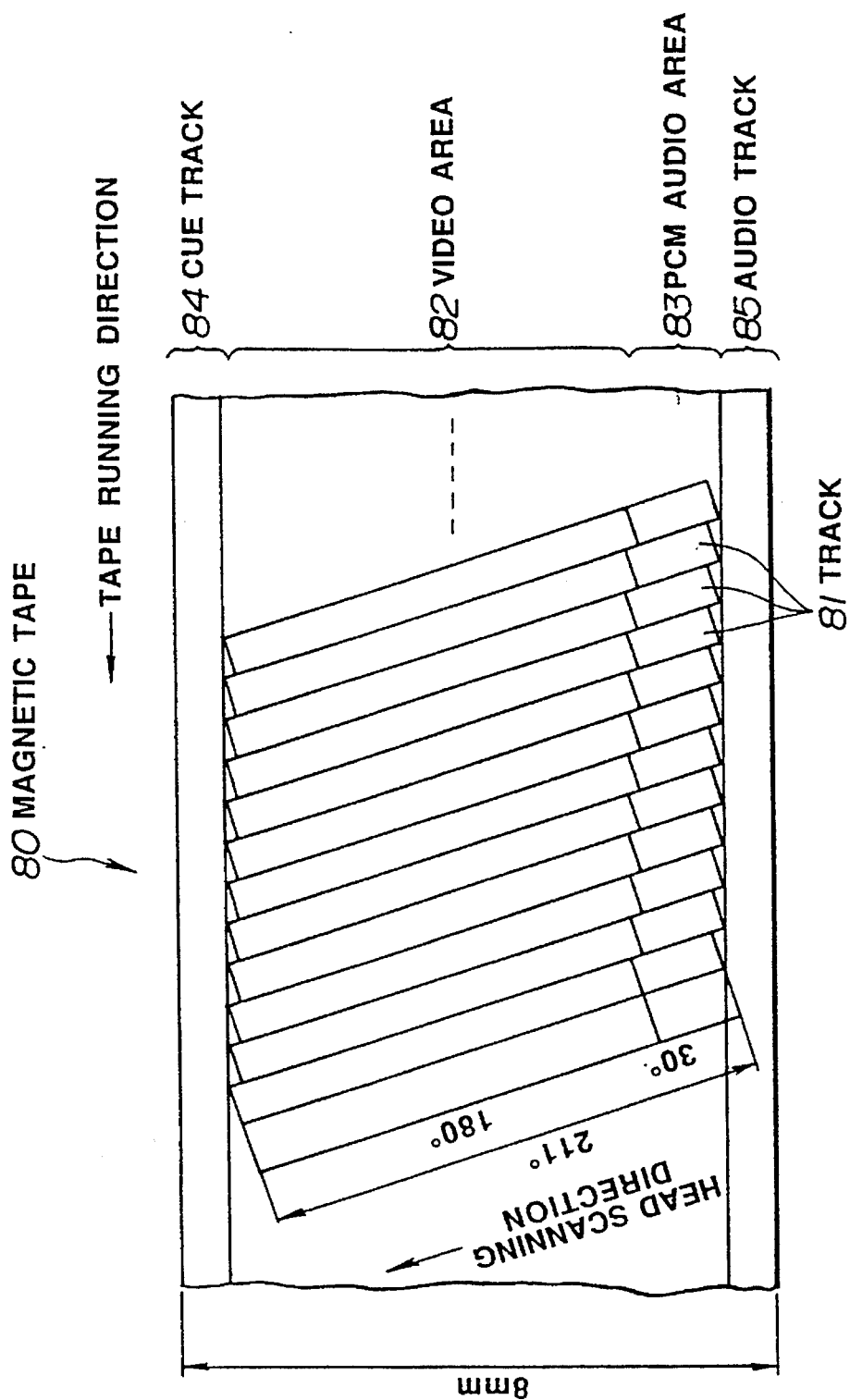
FIG. 13 shows a tape format of a magnetic tape employed in an 8 mm video tape recorder.

The magnetic tape 1 has a tape format similar to that of the magnetic tape 80 shown for example in FIG. 13. That is, a track obliquely formed on the magnetic tape 1 by helical scanning of the rotary head 45 is divided into a video area and a PCM audio area, and moving pictures are recorded as analog video signals in the video area. Various digital signals, such as voice signals, still pictures or computer graphics data are recorded in the PCM audio area as PCM audio signals, digital video signals and digital signals, respectively.

Figure 14:
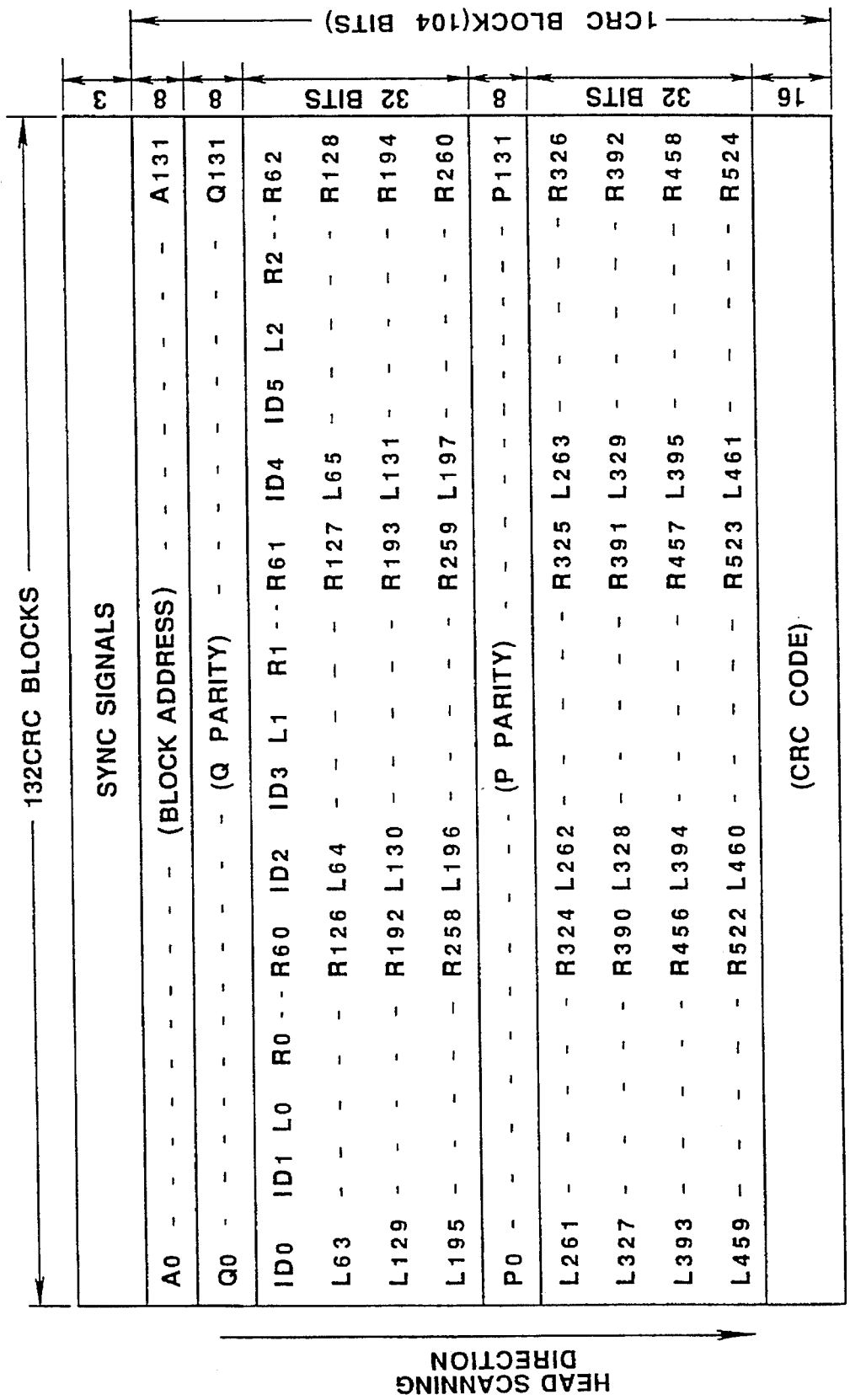
FIG. 14 shows a data format of a PCM audio area of the magnetic tape of FIG. 13.

The format of the PCM audio area is similar to the format described above in connection with FIG. 14. That is, with the NTSC system, there are recorded, in each track (corresponding to one field) of the PCM audio area, data of 1050 (L0 to L524, R0 to R524) 8-bit words and 6 IDs, each consisting of 8 bits. Specifically, each track of the PCM audio area is constituted by 132 CRC blocks. Turning to the format of each CRC block, 3-bit synchronization signals, 8-bit block address, 8-bit Q-parity, 4-word data or ID, 8-bit Q-parity, 4-word data and 16-bit CRC code are arrayed in this, order. With the PAL system, the above figures are 1250 words/track and 157 CRC blocks/track.

The operation of the above described VTR is hereinafter explained.

This VTR is adapted for recording video signals of a moving picture as analog signals in the video area and recording voice signals, video signals of a still picture etc. as digital signals in the PCM audio area as well as recording the types of the digital signals recorded in the PCM audio area, such as voice signals or video signals, or attributes thereof, such as sampling frequencies or whether or not data compression has been made, etc. as IDs in a predetermined region of the PCM audio area. The VTR is also adapted for reproducing video signals of a moving picture recorded in the video area and discriminating the types and attributes of digital signals recorded in the PCM audio area based on the IDs as well as reproducing video signals of the still picture or voice signals in accordance with the discriminated types and attributes.

A first example of usage allocation of the IDs is hereinafter explained.

Figure 4:
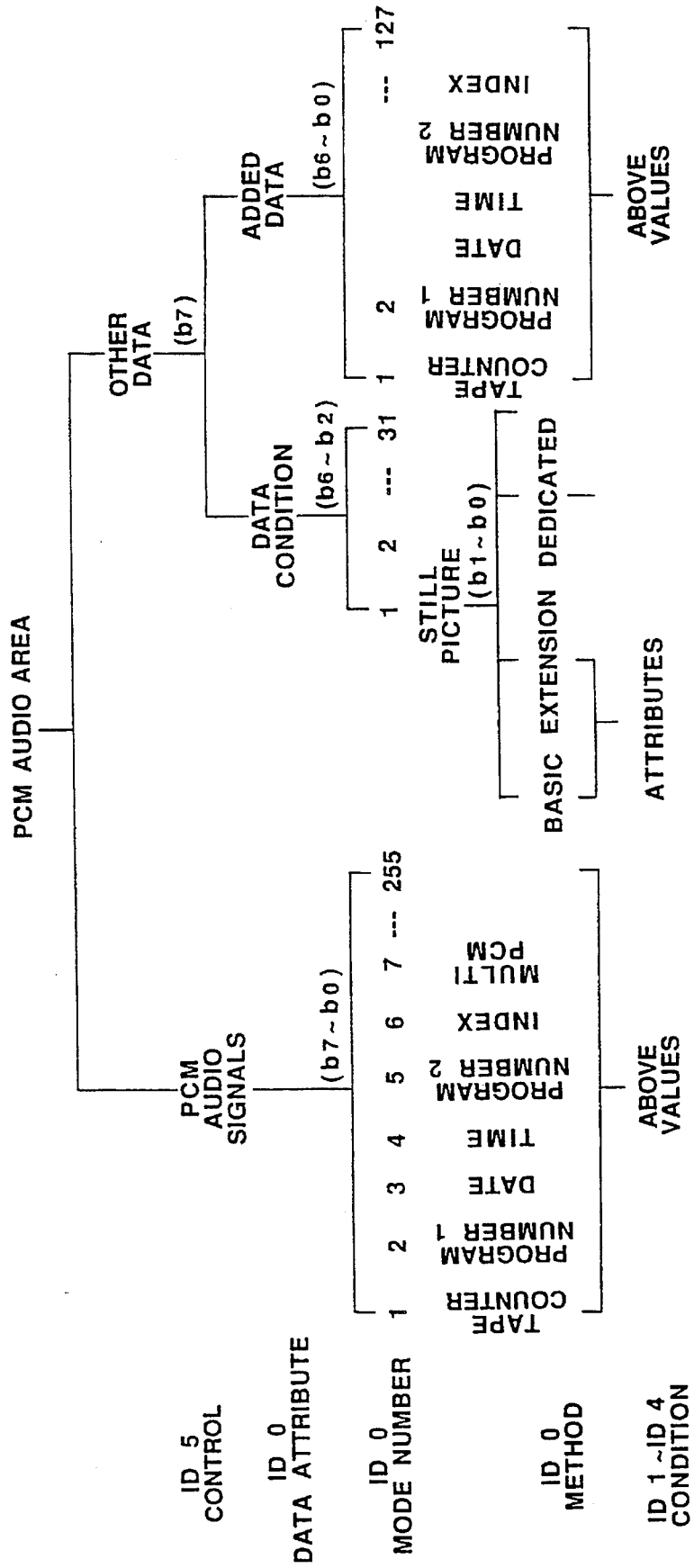
FIG. 4 shows a first example of an ID adopted for use by the embodiment of FIG. 1.
Figure 5:
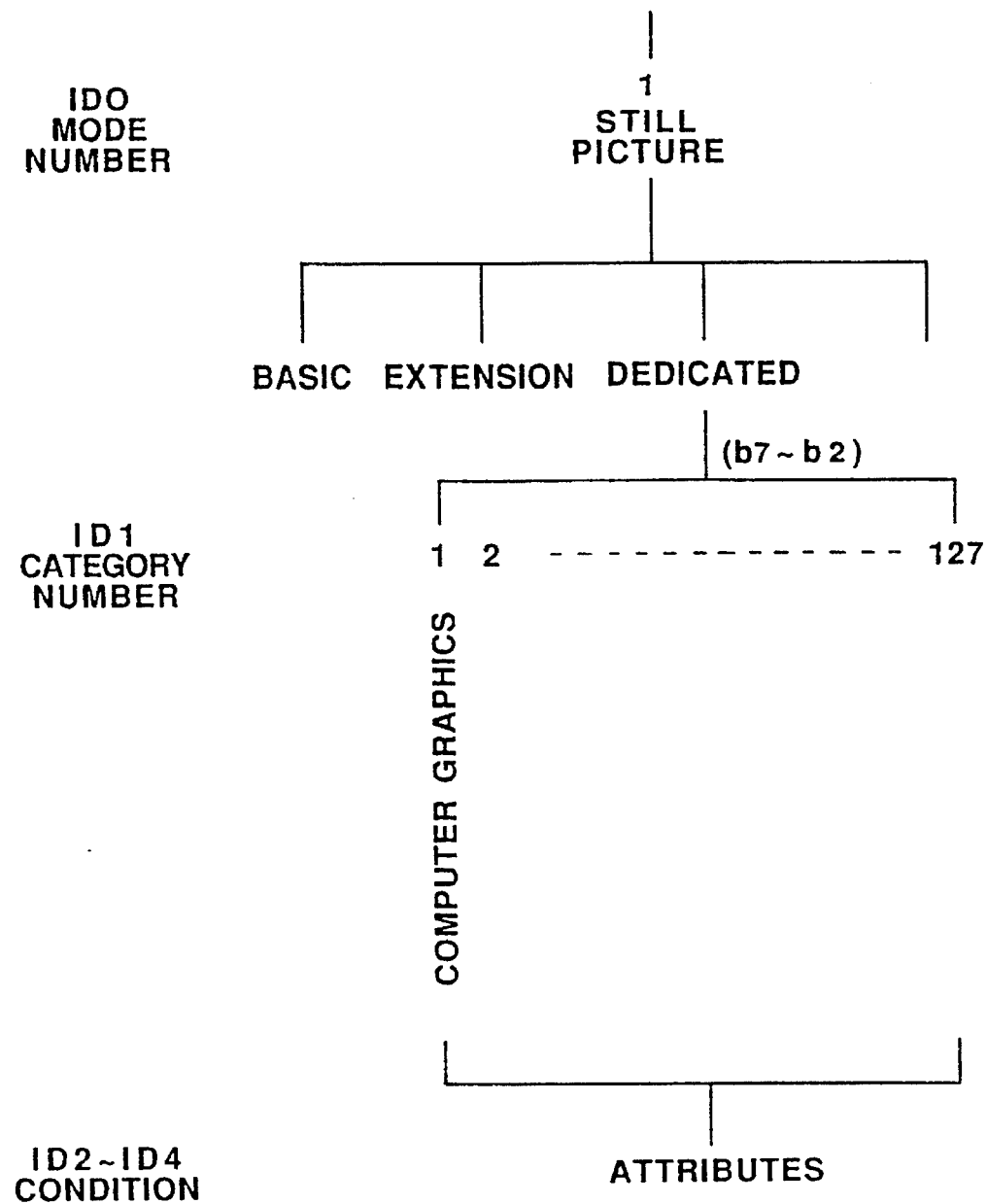
FIG. 5 shows an example of an ID for a still picture recording dedicated mode of the FIG. 1 embodiment.

In each track of the PCM audio area, corresponding to one field, six IDs, that is ID0, ID1, ID2, ID3, ID4 and ID5 are arrayed. Various roles, such as discrimination of the types of digital signals, are allocated to these IDs, as shown for example in FIG. 4.

That is, the ID5 (control) is an identification code for discriminating PCM audio signals recorded in the PCM audio area, referred to hereinafter as PCM audio signal recording mode, from other data, referred to hereinafter as other data recording mode.

In the PCM audio signal recording mode, the ID0 (data attribute and mode data) is an identification code for discriminating the types of additional data, such as tape counter, data etc. recorded in ID1 to ID4.

In the other data recording mode, ID0 is an identification code for discriminating the types of the additional data recorded in ID1 to ID4, referred to as additional data recording mode) or data recorded in the PCM audio area, such as video signals of a still picture, referred to as data recording mode, as well as discriminating if the data recorded in the PCM audio area, for example, video signals of the still picture, belong to the basic function or system in which playback interchangeability with VTRs of any producers is assured, referred to hereinafter as still picture recording basic mode, to the extended function or system in which intechangeability is assured in one direction as a result of progress or development from the basic system, referred to hereinafter as a still picture recording extension mode, or to the dedicated function or system which is defined independently of the basic function or the extended function and in which interchangeability with the two functions is not assured. Meanwhile, interchangeability in one direction means that an apparatus having an extension mode of still picture recording necessarily has the basic mode of still picture recording and is capable of recording or reproducing data belonging to the basic mode of still picture recording, whereas an apparatus having only a basic mode of still picture recording is not capable of recording or reproducing data belonging to the extension mode of still picture recording.

In the PCM audio signal recording mode or additional data recording mode, the ID1 to ID4 have the values of the added data such as tape counter. In the data recording mode, for example, in a mode of recording video signals of a still picture in the PCM audio area, referred to hereinafter as a still picture recording mode, the ID1 to ID4 have the values of indicating the attributes of the recorded video signals, such as recording start and end positions of digital video signals, the types of digital video signals, such as luminance signals and chrominance signals, so-called RGB signals, etc., sampling frequency or whether or not data compression has been made.

Specifically, the ID5 is composed of 8 bits ($b_7$ to $b_0$), where $b_7$ is an upper most bit and $b_0$ is a lower most bit. As shown for example in Table 3, ID5=⌈XXX11XX1⌋ (X is 1 or 0) indicates the PCM audio signal recording mode and ID5=⌈XXX00111⌋ indicates the other data recording mode.

TABLE 3

| Designation | Usage | Bit Allocation |
|---|---|---|
| I D 5 | Control | $b_7$: Dubbing Protect<br>0 : Non-Protect<br>1 : Protect<br>$b_6\ b_5$: Rec. Start/End Point<br>0  1 : Rec. Start Point<br>1  0 : Rec. End Point<br>1  1 : between Start and End<br>0  0 : (not used)<br>$b_4$: CH 2<br>1 : Audio<br>0 : Others<br>$b_3$: CH 1<br>1 : Audio<br>0: Others<br>$b_2\ b_1$: Sound<br>0  0 : Mono<br>1  0 : Stereo<br>0  1 : Bi-lingual<br>1  1 : Ohters<br>$b_0$: Data Valid<br>1 : Valid<br>0 : Invalid |

The ID0 is composed of 8 bits ($b_7$ to $b_0$). In the PCM audio signal recording mode (ID5=⌈XXX11XX1⌋), the ID0 is a mode number for discriminating the type of additional data recorded in the ID1 to ID4, such as tape counter, program number 1, date, time, program number 2, index, multi PCM, . . . For example, ID0=⌈00000001⌋, ⌈00000010⌋, ⌈00000011⌋, ⌈00000100⌋, ⌈00000101⌋, ⌈00000110⌋ and ⌈00000111⌋ indicate tape counter, program number 1, date, time, program number 2, index and multi PCM, respectively.

In the other data recording mode (ID5=⌈XXX00111⌋), the upper most bit of ID0 ($b_7$) is an identification code for discriminating the additional data recording mode from the data recording mode, as shown for example in Table 4. Thus, $b_7$=⌈0⌋ indicates an additional data recording mode and $b_7$=⌈1⌋ indicates the data recording mode.

TABLE 4

| Desingation | Usage | Bit Allocation | | | | | | | |
|---|---|---|---|---|---|---|---|---|---|
| I D 0 | Data Attribute & Mode Number | $b_7$: Data Attribute<br>0 : Added Data<br>1 : Data Condition | | | | | | | |
| | | $b_6$ | $b_5$ | $b_4$ | $b_3$ | $b_2$ | $b_1$ | $b_0$: | Mode Number |
| | | 0 | 0 | 0 | 0 | 0 | 0 | 0: | (reserved) |
| | | 0 | 0 | 0 | 0 | 0 | 0 | 1: | Tape Counter |
| | | 0 | 0 | 0 | 0 | 0 | 1 | 0: | Program Number 1 |
| | | 0 | 0 | 0 | 0 | 0 | 1 | 1: | Date |
| | | 0 | 0 | 0 | 0 | 1 | 0 | 0: | Time |
| | | 0 | 0 | 0 | 0 | 1 | 0 | 1: | Program Number 2 |
| | | 0 | 0 | 0 | 0 | 1 | 1 | 0: | Index |
| | | 0 | 0 | 0 | 0 | 1 | 1 | 1: | (reserved) |
| | | . | | | . | | | : | |
| | | 1 | 1 | 1 | 1 | 1 | 1 | 1 | (reserved) |

TABLE 4-continued

| Desingation | Usage | Bit Allocation | | | | | |
|---|---|---|---|---|---|---|---|
| | | (for $b_7$=1) | | | | | |
| | | $b_6$ | $b_5$ | $b_4$ | $b_3$ | $b_2$: | Data Condition |
| | | 0 | 0 | 0 | 0 | 0: | (reserved) |
| | | 0 | 0 | 0 | 0 | 1: | Still Video |
| | | . | | | | : | |
| | | . | | | | | |
| | | 1 | 1 | 1 | 1 | 1: | (reserved) |
| | | (for $b_7$=1) | | | | | |
| | | $b_2$ | $b_0$: | Method | | | |
| | | 0 | 0: | Basic System | | | |
| | | 0 | 1: | Extended System | | | |
| | | 1 | 0: | Dedicated System | | | |
| | | 1 | 1: | (reserved) | | | |

In the additional data recording mode ($b_7$=⌈0⌋), the remaining seven bits ($b_6$ to $b_0$) are mode numbers for discriminating the types of the additional data, such as tape counter, recorded in the ID1 to ID4. For example, ID0= ⌈00000001⌋, ⌈00000010⌋, ⌈00000011⌋, ⌈00000100⌋, ⌈00000101⌋ and ⌈00000110⌋ indicate tape counter, program number 1, date, time, program number 2 and index, respectively. That is, in the additional data recording mode, ID1 to ID4 are the mode numbers almost similar to the above mentioned PCM audio signal recording mode.

In the data recording mode ($b_7$=⌈1⌋), the succeeding five bits ($b_6$ to $b_2$) indicate the mode number for discriminating the type of data recorded in the PCM audio area such that $b_6$ to $b_2$=⌈00001⌋ indicate the still picture recording mode, as shown in Table 4. In the still picture recording mode $b_6$ to $b_2$=⌈00001⌋, the remaining two bits ($b_1$, $b_0$) are system numbers for discriminating the basic mode for still picture recording, extension mode for still picture recording and dedicated mode for still picture recording, as shown in Table 4. Thus $b_1$ to $b_0$=⌈00⌋, ⌈01⌋, ⌈10⌋ indicate the basic mode, extension mode and dedicated mode for the still picture recording, respectively.

The ID1 is composed of 8 bits ($b_7$ to $b_0$) and, in the basic mode for still picture recording (ID5=⌈XXX00111⌋ and ID0=⌈10000100⌋), the upper two bits ($b_7$, $b_6$) are identification codes for discriminating the start or end positions of a track in which digital video signals are recorded. For example, $b_7$ to $b_6$=⌈01⌋, ⌈10⌋ and ⌈11⌋ indicate the start position, end position and an intermediate position, respectively. The succeeding two bits $b_5$, $b_4$ are identification bits for discriminating the types of the digital video signals, such that $b_5$ ... $b_4$=⌈00⌋ indicate luminance signals and chrominance signals, respectively. The succeeding two bits ($b_3$, $b_2$) are identification bits for discriminating the types of the sampling frequencies of digital video signals, such that $b_3$ ... $b_2$=⌈00⌋, ⌈01⌋ indicate 910 fH and 1365 fH, respectively. The next succeeding bit, ($b_1$) is an identification bit for discriminating whether digital video signals have been processed with data compression, such that $b_1$=⌈1⌋ indicates that data compression has been made. The lower 1 bit, ($b_0$) is an identification code for discriminating whether the video signals of the still picture are recorded on the frame-by-frame basis or on the field-by-field basis, such that $b_0$=⌈0⌋ and ⌈1⌋ indicate the former and the latter, respectively.

TABLE 5

| Designation | Usage | Bit Allocation | | |
|---|---|---|---|---|
| I D 1 | Condition | $b_7$ | $b_6$: | Data Start/End Point |
| | | 0 | 1: | Start Point |
| | | 1 | 0: | End Point |
| | | 1 | 1: | between Start and End |
| | | 0 | 0: | (reserved) |
| | | $b_5$ | $b_4$: | Data Contents |
| | | 0 | 0: | Y, chrominance |
| | | 0 | 1: | (reserved) |
| | | 1 | 0: | (reserved) |
| | | 1 | 1: | (reserved) |
| | | $b_3$ | $b_2$: | Sampling Frequency |
| | | 0 | 0: | Corresp. to 910fH |
| | | 0 | 1: | Corresp. to 1365fH |
| | | 1 | 0: | (reserved) |
| | | 1 | 1: | (reserved) |
| | | $b_1$: | | Compression |
| | | 0: | | OFF |
| | | 1: | | ON |
| | | $b_0$: | | Field/Frame |
| | | 0: | | Field |
| | | 1: | | Frame |

On the other hand, in the still picture recording extension mod (ID5=⌈XXX00111⌋, ID0=⌈10000101⌋), the upper two bits of ID1 ($b_7$, $b_6$) indicate the start, and end positions of the track in which digital video signals are recorded, as shown in Table 6, as in the case of the above mentioned still picture recording basic mode. The next, succeeding two bits ($b_5$, $b_4$) are identification signals for discriminating the types of the digital video signals, such that $b_5$ ... $b_4$=⌈00⌋, ⌈0⌋ indicate luminance signals, chrominance signals and RGB signals, respectively. The next succeeding two bits ($b_3$, $b_2$) are identification codes for discriminating the types of the sampling frequencies of digital video signals, as in the case of the above mentioned still picture recording basic mode. The next succeeding 1 bit ($b_1$) is an identification code for discriminating the type of the data compression ratio of digital video signals, such that $b_1$=⌈0⌋ indicates the compression ratio of ⅛ in ADRC. The lower 1 bit ($b_0$) is an identification code for discriminating whether the video signals of a still picture are recorded on the frame-by-frame basis or on the field-by-field basis, as in the case of the above mentioned still picture recording basic mode.

TABLE 6

| Designation | Usage | Bit Allocation | | |
|---|---|---|---|---|
| I D 1 | Condition | $b_7$ | $b_6$: | Data Start/End Point |

TABLE 6-continued

| Designation | Usage | Bit Allocation | | |
|---|---|---|---|---|
| | | 0 1: | Start Point | |
| | | 1 0: | End Point | |
| | | 1 1: | between Start and End | |
| | | 0 0: | (reserved) | |
| | | $b_5$ $b_4$: | Data Contents | |
| | | 0 0: | Y, chrominance | |
| | | 0 1: | R, G, B | |
| | | 1 0: | (reserved) | |
| | | 1 1: | (reserved) | |
| | | $b_3$ $b_2$: | Sampling Frequency | |
| | | 0 0: | Corresp. to 910fH | |
| | | 0 1: | Corresp. to 1365fH | |
| | | 1 0: | (reserved) | |
| | | 1 1: | (reserved) | |
| | | $b_1$: | Compression | |
| | | 0: | ⅛ | |
| | | 1: | (reserved) | |
| | | $b_0$: | Field/Frame | |
| | | 0: | Field | |
| | | 1: | Frame | |

In the still picture recording dedicated mode (ID5=⌈XXX00111⌋, ID0=⌈0000110⌋), the upper 6 bits ($b_7 \ldots b_2$) of ID1 are category numbers for discriminating video signals different in type from still picture video signals in the still picture basic mode and still picture recording extension mode, for example, digital video signals by computer graphics. Thus, for example, $b_7 \ldots b_2$ indicate video signals by computer graphics. The remaining two bits ($b_1$, $b_0$) are identification codes for discriminating the start position and the end position of the track in which digital video signals are recorded.

TABLE 7

| Designation | Usage | Bit Allocation | | | | | | | |
|---|---|---|---|---|---|---|---|---|---|
| ID 1 | Category Number & Data Start/ End Point | $b_7$ 0 0 | $b_6$ 0 0 | $b_5$ 0 0 | $b_4$ 0 0 | $b_3$ 0 0 | $b_2$: 0: 1: | Category Number (reserved) Computer Graphics | |
| | | 0 | 0 | 0 | 0 | 1 | 0: | (reserved) | |
| | | . | | | | | | | |
| | | 1 | 1 | 1 | 1 | 1 | 1: | (reserved) | |
| | | $b_1$ | $b_0$: | Data Start/End Point | | | | | |
| | | 0 | 1: | Start Point | | | | | |
| | | 1 | 0: | End Point | | | | | |
| | | 1 | 1: | between Start and End | | | | | |
| | | 0 | 0: | (reserved) | | | | | |

The ADRC with the above compression ratio of ⅛ in the still picture recording extension mode is briefly explained.

As explained above, the ADRC is an adaptive variable length coding, such that the volume of data generated per frame or per field is changed depending on a picture pattern. Meanwhile, if operability or editability is taken into account, it is necessary to control the volume of the generated information to be constant. For this reason, in still picture recording extension mode, the ADRC is adopted as a data compression method, and is subjected to control which will be explained hereinbelow so that the data volume per frame or per field will be constant, for example, the data volume will be one-eighth the volume prior to compression.

Figure 6:
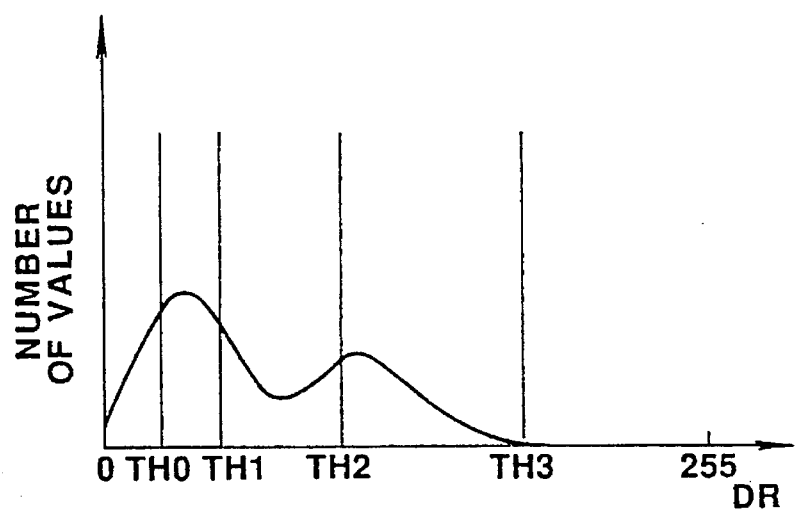
FIG. 6 is a graph showing a distribution of dynamic range values for illustrating a principle for maintaining the amount of information generated in ADRC constant.
Figure 7:
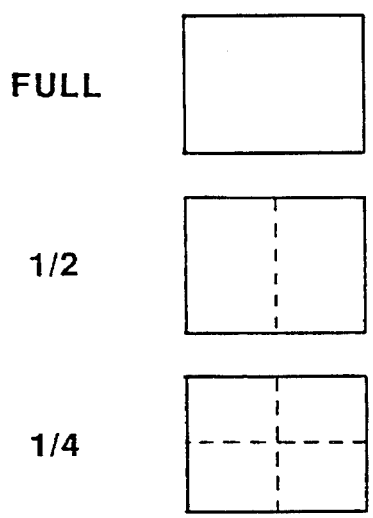
FIG. 7 illustrates a plurality of screen sizes.

That is, as shown in FIG. 6, the number of values of the dynamic range DR of each block within one frame or field is found. 0, 1, 2, 3 and 4 bits are allocated to a block having dynamic ranges DR less than the threshold values TH0, TH0 ... TH1, TH1 ... TH2, TH2 ... TH3 and TH3 or more, respectively, and the threshold values TH0 ... TH4 are control led so that the data volume of compressed data per frame or per field will be constant, e.g., ⅛.

The ID2, ID3 and ID4 are each constituted by 8 bits ($b_7 \ldots b_0$). For example, in the still picture recording basic mode and still picture recording extension mode (ID5=⌈XXX00111⌋, ID0=⌈1000010X⌋, the upper four bits of ID2 ($b_7 \ldots b_4$), the upper four bits of ID3 ($b_7 \ldots b_4$) and lower four bits of ID3 ($b_3 \ldots b_0$) denote values of hundreds, tens and units of a block number of each of plural blocks necessary for recording a still picture, respectively, as shown for example in Table 8. One ($b_3$) of lower four bits of ID2 is an identification code for discriminating whether digital video signals of a still picture are recorded (+) or not (−), while two bits ($b_2$, $b_1$) thereof are identification codes for discriminating validity of digital video signals. The ID4 is a frame number which is incremented by one for each two tracks or for each image frame.

TABLE 8

| Designation | Usage | Bit Allocation | | | | | | | |
|---|---|---|---|---|---|---|---|---|---|
| ID 2 | Data Block Number | $b_7$ 0 0 | $b_6$ 0 0 | $b_5$ 0 0 | $b_4$: 0 1 | (×100) | | | |
| | | . | | | | | | | |
| | | 1 | 0 | 0 | 1 | | | | |
| | | $b_3$: 0: 1: | (+/−) + − | | | | | | |
| | | $b_2$ 0 0 1 1 | $b_1$: 0: 1: 0: 1: | Data Valid Valid Data (reserved) (reserved) (reserved) | | | | | |
| | | $b_0$: | (reserved) | | | | | | |
| ID 3 | Data Block Number | $b_7$ 0 0 | $b_6$ 0 0 | $b_5$ 0 0 | $b_4$: 0 1 | (×10) | | | |
| | | . | | | | | | | |
| | | 1 | 0 | 0 | 1 | | | | |
| | | $b_3$ 0 0 1 | $b_2$ 0 0 0 | $b_1$ 0 0 0 | $b_0$: 0 1 1 | (×1) | | | |
| ID 4 | Frame Number | $b_7$ 0 0 | $b_6$ 0 0 | $b_5$ 0 0 | $b_4$ 0 0 | $b_3$ 0 0 | $b_2$ 0 0 | $b_1$ 0 0 | $b_0$ 0 1 |
| | | . | | | | | | | |
| | | 1 | 1 | 1 | 1 | 1 | 1 | 1 | 1 |

On the other hand, in a still picture recording dedicated mode (ID5=⌈XXX00111⌋, ID0=⌈10000110⌋, for example the upper two bits ($b_7$, $b_6$) are identification codes for discriminating types of digital video signals, such as RGB signals, so-called B&W (black and white) signals, so-called CLUT (color lookup table), etc., such that $b_7 \ldots b_6$=⌈00⌋, ⌈01⌋ and ⌈10⌋ indicate RGB signals, B&W signals and CLUT signals, respectively. In the case of the RGB signals and B&W signals, the next following two bits ($b_5$, $b_4$) are identification codes indicating the numbers of bits per pixel, such that $b_5 \ldots b_4$=⌈00⌋, ⌈01⌋, ⌈10⌋ indicate 8, 4 and 1 bits, respectively. The remaining two bits ($b_1$, $b_0$) are identification codes for indicating screen sizes, such that $b_1 \ldots b_0$=⌈00⌋, ⌈01⌋ and ⌈10⌋ indicate the full size, ½ size and ¼ size, respectively.

TABLE 9

| Designation | Usage | Bit Allocation | | | |
|---|---|---|---|---|---|
| I D 2 | Condition | $b_7$ | $b_6$: | Data Contents | |
| | | 0 | 0: | R, G, B | |
| | | 0 | 1: | B&W | |
| | | 1 | 0: | CLUT | |
| | | 1 | 1: | (reserved) | |
| | | $b_5$ | $b_4$: | Quantization | |
| | | | | $b_7b_6$=0X | $b_7b_6$=10 |
| | | 0 | 0: | 8bit | (reserved) |
| | | 0 | 1: | 4bit | (reserved) |
| | | 1 | 0: | 1bit | (reserved) |
| | | 1 | 1: | (reserved) | (reserved) |
| | | $b_3$ | $b_2$: | Resolution | |
| | | 0 | 1: | 480 × 640 pixels | |
| | | 0 | 1: | (reserved) | |
| | | 1 | 0: | (reserved) | |
| | | 1 | 1: | (reserved) | |
| | | $b_1$ | $b_0$: | Size | |
| | | 0 | 0: | Full | |
| | | 0 | 1: | ½ | |
| | | 1 | 0: | ¼ | |
| | | 1 | 1: | (reserved) | |

Figure 10:
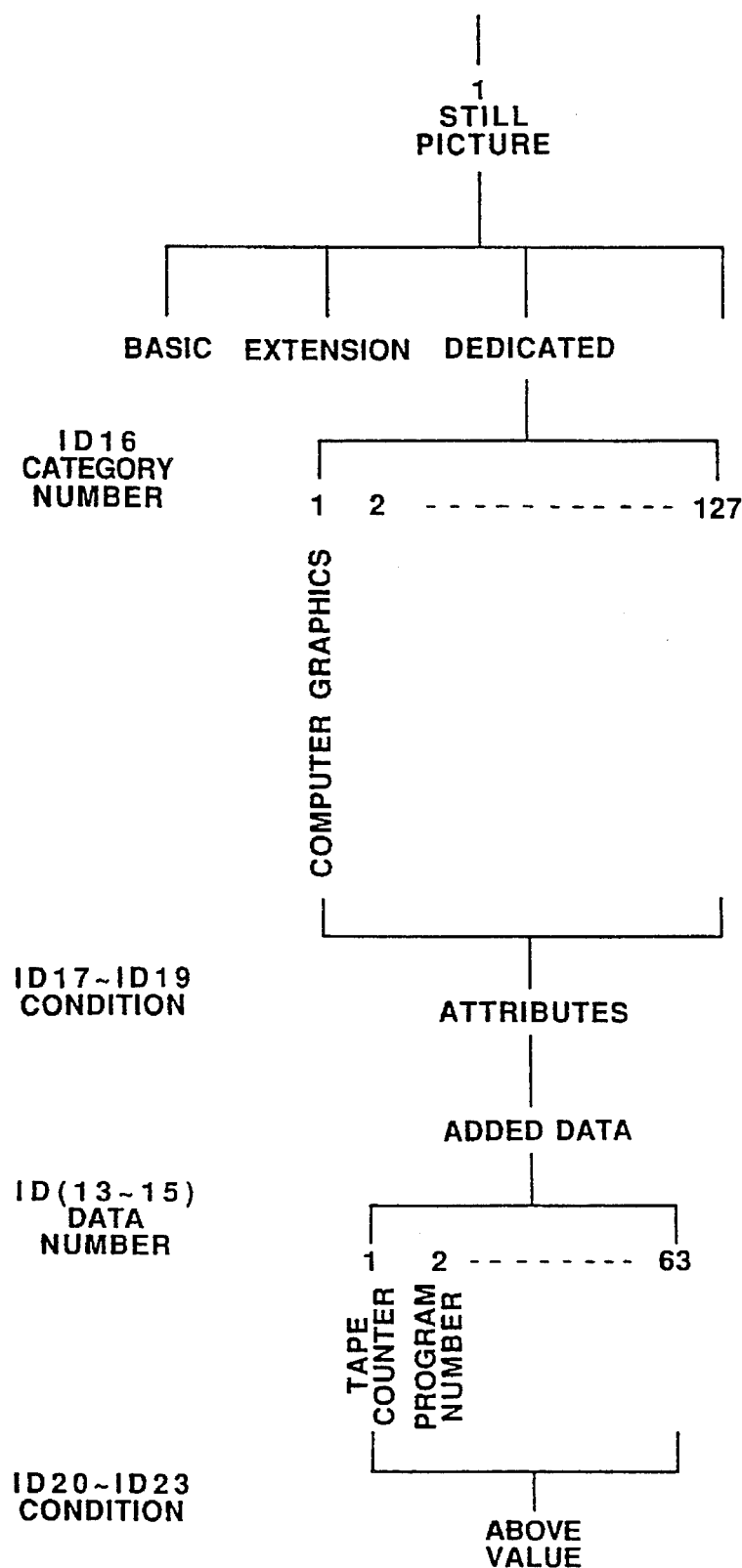
FIG. 10 shows an example of an ID for a still picture recording dedicated mode of the Hi-8 PCMVTR.
Figure 11:
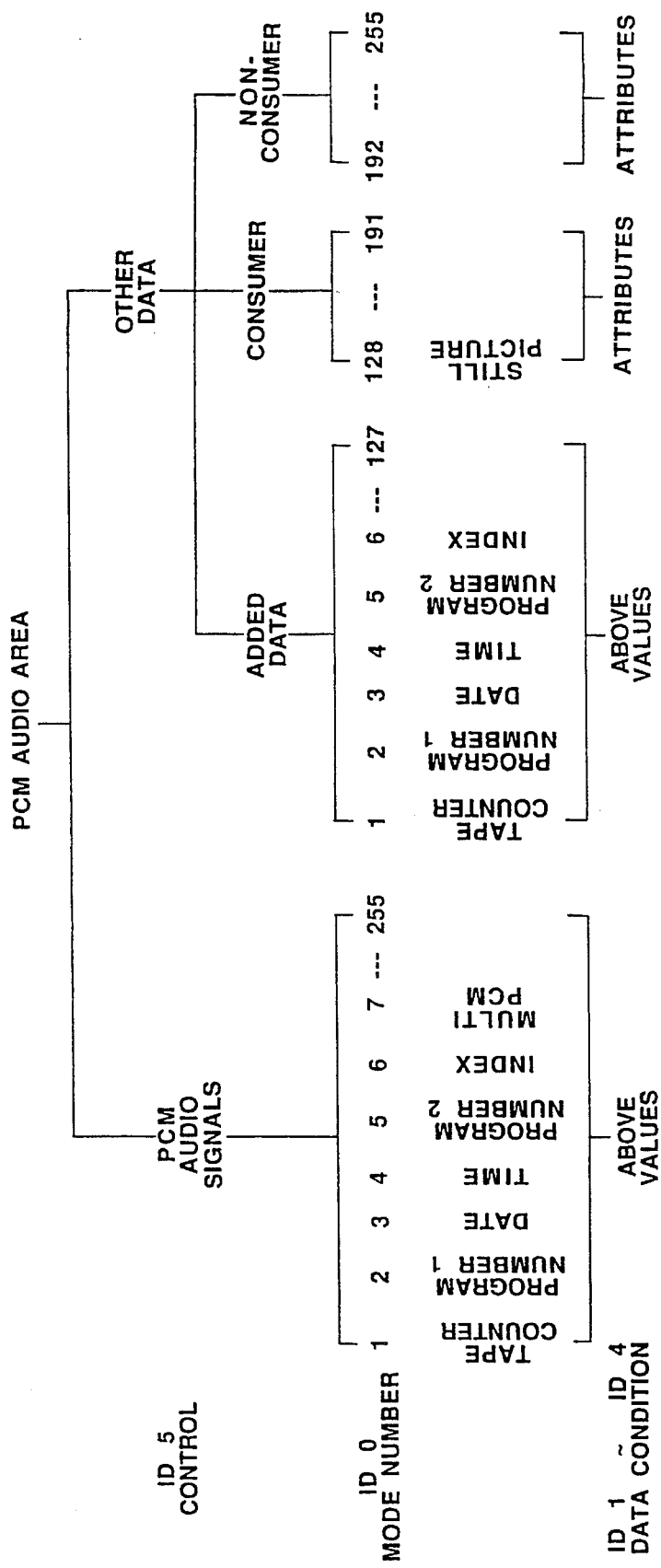
FIG. 11 shows a second example of an ID for use by the embodiment of FIG. 1.
Figure 12:
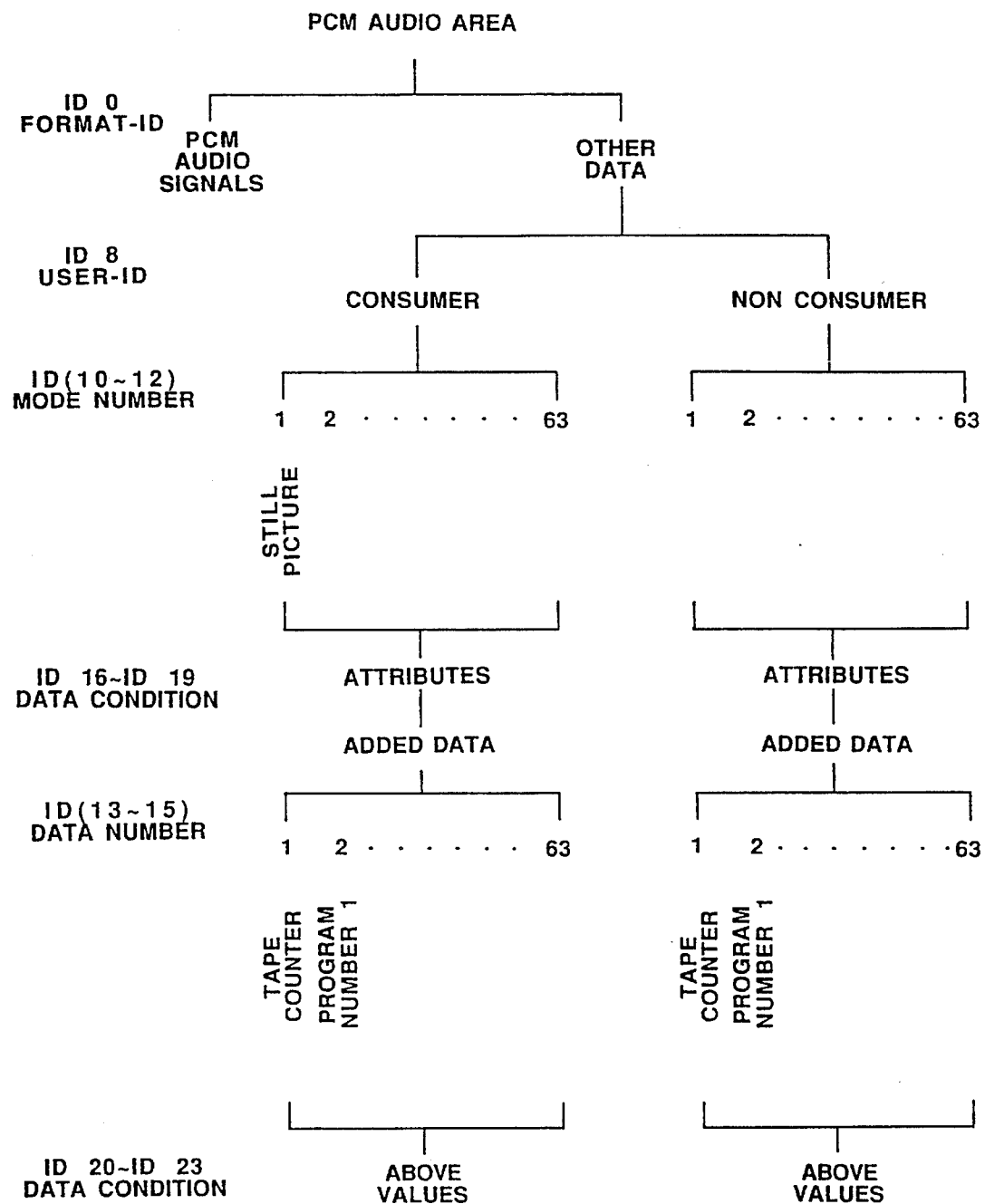
FIG. 12 shows a second example of an ID for use by the Hi-8 PCMVTR.

For example, in the still picture recording dedicated mode (ID5=⌐XXX00111⌐, ID0=⌐1000010X⌐, the upper four bits of ID3 ($b_7 \ldots b_4$), the upper four bits of ID3 ($b_7 \ldots b_4$) of ID4 and lower four bits of ID4 ($b_3 \ldots b_0$) denote values of hundreds, tens and units of a block number of each of plural blocks necessary for recording a still picture, as shown for example in FIG. 10, respectively. One ($b_3$) of lower four bits of ID3 is an identification code for discriminating whether digital video signals of a still picture are recorded (+) or not (−), while two bits ($b_2$, $b_1$) thereof are identification codes for discriminating validity of digital video signals.

TABLE 10

| Designation | Usage | Bit Allocation | | | | |
|---|---|---|---|---|---|---|
| I D 3 | Data Block Number | $b_7$ | $b_6$ | $b_5$ | $b_4$: | (×100) |
| | | 0 | 0 | 0 | 0 | |
| | | 0 | 0 | 0 | 1 | |
| | | . | | | | |
| | | 1 | 0 | 0 | 1 | |
| | | $b_3$: | (+/−) | | | |
| | | 0: | + | | | |
| | | 1: | − | | | |
| | | $b_2$ | $b_1$: | Data Valid | | |
| | | 0 | 0: | Valid Data | | |
| | | 0 | 1: | (reserved) | | |
| | | 1 | 0: | (reserved) | | |
| | | 1 | 1: | (reserved) | | |
| | | $b_0$: | (reserved) | | | |
| I D 4 | Data Block Number | $b_7$ | $b_6$ | $b_5$ | $b_4$: | (×10) |
| | | 0 | 0 | 0 | 0 | |
| | | 0 | 0 | 0 | 1 | |
| | | . | | | | |
| | | $b_3$ | $b_2$ | $b_1$ | $b_0$: | (×1) |
| | | 0 | 0 | 0 | 0 | |
| | | 0 | 0 | 0 | 1 | |
| | | . | | | | |
| | | 1 | 0 | 0 | 1 | |

With the present VTR, the IDs allocated as explained above are recorded in a predetermined area of the PCM audio range, so that, when recording digital signals in the PCM audio range, the types of the recorded digital signals may be discriminated during playback.

In the case of a still picture imaging mode of recording digital video signals of a still picture imaged by the camera unit 10 in a PCM audio area of the magnetic tape 1, the still picture is recorded as digital video signals in the PCM audio area of the magnetic tape 1, on actuation of a shutter, not shown, while ID5 and ID0, indicating that the digital signals recorded in the PCM audio area are digital signals belonging to the still picture recording basic mode etc., and ID1 to ID4, indicating attributes such as the sampling frequencies of digital video signals, whether or not data are previously compressed and, if necessary, the values of added data such as tape counter, are recorded simultaneously.

Thus, when the function control circuit 51 sets the still picture imaging mode and the attributes of the digital video signals of the still picture to be recorded, such as the sampling frequencies or whether or not data have previously been compressed, the system controller 52 performs a control operation so that control signals associated with the setting are detected and the various units are operated in the still picture imaging mode. On actuation of the shutter, the system controller 52 detects shutter signals transmitted from the shutter via terminal 54 and records one-frame or one-field image signals from the camera unit 10 in the PCM audio area of the magnetic tape 1 as digital signals via still picture image signal processing unit 30 and head unit 40, while simultaneously recording the above mentioned various IDs.

Specifically, the imaging signals from CCD 11 are converted into digital signals in S/H and AGC circuit 12, A/D converter 13 and camera processing circuit 14 and subsequently processed by knee and gamma processing. The video signals thus processed are transmitted via still picture video processing circuit 31 to video RAM 31.

On actuation of the shutter, the system controller 52 also controls a motor, not shown, causing the magnetic tape 1 to start to travel, while controlling the memory controller 53 to store video signals from the camera processing circuit 14 in video RAM 32. The video RAM 32 sequentially stores one-frame or one-field video signals in accordance with write addresses from memory controller 53 synchronized with line sequential scanning of, for example, CCD 11.

The system controller 52 then controls memory controller 53 for reading out video signals stored in video RAM 32, while transmitting ID5 indicating that the digital signals to be recorded belong to other data recording mode, ID0 indicating that the digital signals to be recorded belong to e.g. still picture recording basic mode, and ID1 to ID4 indicating the attributes of the digital video signals, to PCM processing circuit 33. The video RAM 32 sequentially reads out video signals, depending on the readout addresses synchronized with e.g. data compression processing from the PCM processing circuit 33 for supplying the read-out video signals to still picture video processing circuit 31, whereby the sequentially read-out video signals are compressed if need be to produce compressed data which are supplied to the PCM processing circuit 33. For example, if the time required for recording is of first preference, data compression is carried out, whereas, if the picture quality is of first preference, data compression is not carried out.

The PCM processing circuit 33 first stores the compressed data from the still picture video processing circuit 31 in RAM 34, from which the compressed data are sequentially read out and interleaved. Synchronizing signals, error correction code and ID0 to ID5 supplied from system controller 52 are appended to the interleaved data to produce still picture data which are supplied to MUX 41.

On the other hand, video processing circuit 21 converts video signals from camera processing circuit 14 into video signals conforming to, for example, NTSC system, and transmits the resulting video signals via changeover switch 27 to D/A converter 23. The D/A converter 23 converts video signals (digital signals) conforming to the NTSC system into analog signals which are then transmitted via terminal 26 to e.g. a monitor television receiver, not shown. This enables a picture being imaged to be monitored.

MUX 41 transmits video signals from PCM processing circuit 33, that is the above still picture data, to rotary head 45 via changeover switch 42 and amplifier 43. The result is that, each time the shutter is actuated, one-frame digital video signals are recorded on tens to hundreds of tracks in the PCM audio area of the magnetic tape 1, at the same time that ID0 to ID5 indicating that the recorded digital signals belong to e.g. the still picture recording basic mode.

Specifically, if for example the digital video signals are composed of luminance signals and chrominance signals, the sampling frequency is 910 fH, data compression is effected for shortening the time required for recording, and the recording is made on the field-by-field basis, that is if the mode is the still picture recording basic mode, digital signals are recorded in L0 to L524 and R0 to R524 of the PCM audio area. The recorded IDs are ID5=⌈XXX00111⌋, X indicating presence or absence of protection, recording start position etc, ID0=⌈10000100⌋, ID1=⌈XX000010⌋, X indicating the recording start position etc. of digital video signals, ID2=⌈XXXX000X⌋, X indicating the values of the hundreds of the block number, ID3=⌈XXXXXXXX⌋, X indicating tens and units of the block number and being a repetition of 0 to 255. Meanwhile, the number of tracks necessary for recording a still picture depends on the data compression ratio.

Alternatively, the above values of ID0 to ID5 may be recorded at an interval of at least two frames by a CH1 head of rotary head 45, so that, for example, ID5=⌈XXX00111⌋, X being the presence or absence of protection, recording start position etc., ID0=⌈0XXXXXXX⌋, X indicating the type of added data, and ID1=⌈XXXXXXXX⌋, X in ID1 to ID4 indicating the value of added data.

Specifically, if for example the digital video signals are composed of RGB signals, the sampling frequency is 910 fH, data compression is effected for shortening the time required for recording, and the recording is made on the field-by-field basis, that is if the mode is the still picture recording extension mode, digital signals are recorded in L0 to L524 and R0 to R524 of the PCM audio area. The recorded IDs are ID5=⌈XXX00111⌋, X indicating presence or absence of protection, recording start position etc, ID0=⌈10000101⌋, ID1=⌈XX010000⌋, X indicating the recording start position etc of digital video signals, ID2=⌈XXXX000X⌋, X indicating the values of hundreds of the block number, ID3=⌈XXXXXXXX⌋, X indicating tens and units of the block number and being a repetition of 0 to 255.

On the other hand, in the still picture recording dedicated mode, if the still picture recording dedicated mode is set in the function controlling circuit 51, control signals corresponding to the setting are detected and the various units are operated in the still picture recording dedicated mode. The digital video signals for still picture by computer graphics, supplied from the computer via terminal 2, ID5 and ID0 from system control let 52, indicating the still picture recording dedicated mode, and ID1 to ID4, indicating the type of digital video signals etc. are time divisionally multiplexed by MUX 41 and thence supplied via changeover switch 42 and amplifier 43 to rotary head 45. The result is that digital video signals by computer graphics are recorded in L0 to L524 and R0 to R524 of the PCM audio area, while ID0 to ID5, indicating that the recorded digital signals belong to the still picture recording dedicated mode, are recorded in each track.

Specifically, if digital video signals supplied via terminal 2 are CLUT data in which different 8-bit patterns are allocated to various colors obtained by mixing these colors in various proportions (by encoding) as shown for example in Tables 11 and 12, each pixel data is composed of 8 bits, the resolution is 480×640 pixels and the screen size is a full screen size, the CLUT data are recorded in L0 to L524 and R0 to R524 of the PCM audio area. The recorded IDs are ID0=⌈10000110⌋, ID1=⌈000001XX⌋ X indicating presence or absence of protection, recording start position etc, ID2=⌈100000001⌋, ID3=⌈XXXX000X⌋, X indicating the values of the hundreds of the block number, ID4=⌈XXXXXXXX⌋, X indicating tens and units of the block number.

TABLE 11

| Color | Proportions of Three Colors | | |
|---|---|---|---|
| | Red | Green | Blue |
| Aquamarine | 112 | 219 | 147 |
| Black | 0 | 0 | 0 |
| Blue | 0 | 0 | 255 |
| Blue Violet | 159 | 95 | 159 |
| Cadet Blue | 95 | 159 | 159 |
| Coral | 255 | 127 | 0 |
| Cornflower blue | 66 | 66 | 111 |
| Cyan | 0 | 255 | 255 |
| Dark Green | 47 | 79 | 47 |
| Dark Olive Green | 79 | 79 | 47 |
| Dark Orchid | 153 | 50 | 204 |
| Dark Slate Blue | 107 | 35 | 142 |
| Dark Slate Gray | 47 | 79 | 79 |
| Dark Turquoise | 112 | 147 | 219 |
| Dim Gray | 84 | 84 | 84 |
| Firebrick | 142 | 35 | 35 |
| Forest Green | 35 | 142 | 35 |
| Gold | 204 | 127 | 50 |
| Goldenrod | 219 | 219 | 112 |
| Green | 0 | 255 | 0 |
| Green Yellow | 147 | 219 | 112 |
| Indian Red | 79 | 47 | 47 |
| Khaki | 159 | 159 | 95 |
| Light Blue | 191 | 216 | 216 |
| Light Gray | 168 | 168 | 168 |
| Light Steel Gray | 143 | 143 | 188 |
| Lime Green | 50 | 204 | 50 |

TABLE 12

| Color | Proportions of Three COlors | | |
|---|---|---|---|
| | Red | Green | Blue |
| Magenta | 255 | 0 | 255 |
| Maroon | 142 | 35 | 107 |
| Medium Aquamarine | 50 | 204 | 153 |
| Medium Blue | 50 | 50 | 204 |
| Medium Forest Green | 107 | 142 | 35 |
| Medium Goldenrod | 234 | 234 | 173 |
| Medium Orchid | 147 | 112 | 219 |
| Medium Sea Green | 66 | 111 | 66 |
| Medium Slate Blue | 127 | 0 | 255 |
| Medium Spring Green | 127 | 255 | 0 |
| Medium Turquoise | 112 | 219 | 219 |
| Medium Violet Red | 219 | 112 | 147 |
| Midnight Blue | 47 | 47 | 79 |
| Navy | 35 | 35 | 142 |
| Navy Blue | 35 | 35 | 142 |
| Orange | 204 | 50 | 50 |
| Orange Red | 255 | 0 | 127 |
| Orchid | 219 | 112 | 219 |
| Pale Green | 143 | 188 | 143 |

TABLE 12-continued

| Color | Proportions of Three COlors | | |
|---|---|---|---|
| | Red | Green | Blue |
| Pink | 188 | 143 | 143 |
| Plum | 234 | 173 | 234 |
| Red | 255 | 0 | 0 |
| Salmon | 111 | 66 | 66 |
| Sea Green | 35 | 142 | 107 |
| Sienna | 142 | 107 | 35 |
| Sky Blue | 50 | 153 | 204 |
| Slate Blue | 0 | 127 | 255 |
| Spring Green | 0 | 255 | 127 |
| Steel Blue | 35 | 107 | 142 |
| Tan | 219 | 147 | 112 |
| Thistle | 216 | 191 | 216 |
| Turquoise | 173 | 234 | 234 |
| Violet | 79 | 47 | 79 |
| Violet Red | 204 | 50 | 153 |
| Wheat | 216 | 216 | 191 |
| White | 252 | 252 | 252 |
| Yellow | 255 | 255 | 0 |
| Yellow Green | 153 | 204 | 50 |

In the PCM audio signal recording mode of recording PCM audio signals, supplied via terminal 2, PCM audio signals are recorded in the PCM audio area, while ID5 and ID0, indicating that digital signals recorded in the PCM audio area are PCM audio signals and ID0 to ID4 indicating the values of the added data such as the tape counter are also recorded.

Specifically, when the PCM audio signal recording mode is set in the function controlling circuit 51, system controller 52 detects control signals corresponding to the setting to control the various units so that these units are controlled in the PCM audio signal recording mode. The PCM audio signals supplied via terminal 2 rom a voice signal processing circuit, not shown, constituted by e.g. an A/D converter, an encoder for effecting data compression by non-linear quantization and an interleaving circuit etc., ID5 and ID0 from system controller 52, indicating the PCM signal recording mode, and ID1 to ID4 indicating the values of added data such as tape counter are time divisionally multiplexed by MUX 41 so as to be supplied to rotary head 45 via changeover switch 42 and amplifier 43. The result is that the PCM audio signals are recorded in L0 to L524 and R0 to R524 of the PCM audio area, while the IDs to be recorded become ID5=⌈1XX11XX1⌋, X indicating the recording start position, monaural, stereo, etc., ID0=⌈0XXXXXXX⌋, X indicating the types of added data, ID1 to ID4= ⌈XXXXXXXX⌋, X indicating the value of the added data.

The playback mode of reproducing digital signals, such as PCM audio data, still picture digital signals, computer data etc., from the magnetic tape, on which these digital signals are recorded along with IDs indicating the types of the digital signals, based on these IDs, is hereinafter explained.

The present VTR discriminates, on the basis of the above mentioned IDs, to which mode belong the digital signals recorded in the PCM audio area, for example, if the digital signals are PCM audio signals belonging to the PCM audio signal recording mode, video signals belonging to the still picture recording basic mode, video signals belonging to the still picture recording extension mode or video signals belonging to the still picture recording dedicated mode, and proceeds to reproduction of the digital signals if these signals belong to the still picture recording basic mode or extension mode. On the other hand, if the digital signals are video signals belonging to the still picture recording dedicated mode, the VTR ia adapted to apprise the user that the VTR is destitute of the reproducing function and that the digital signals recorded in the PCM audio area belong to the still picture recording dedicated mode.

Specifically, when the function controlling circuit 51 sets the mode to playback mode system controller 52 detects control signals associated with the setting to effect a control so that the respective units are operated in the playback mode. The PCM processing circuit 33 separates and detects synchronizing signals, IDs, etc. from the RF playback signals reproduced from the PCM audio area by the head unit 40. These detected IDs are transmitted to system controller 52.

The system controller 52 discriminates, based on the IDs supplied from PCM processing circuit 33, the types of the digital signals recorded on the magnetic tape 1, such as, for example, PCM audio signals, video signals belonging to still picture recording basic mode, video signals belonging to still picture recording extension mode or still picture recording dedicated mode.

Specifically, the digital signals can be discriminated to be PCM audio signals, video signals belonging to still picture recording basic mode, video signals belonging to still picture recording extension mode and video signals belonging to still picture recording dedicated mode, if ID5= ⌈XXX00111⌋, ID5 is ⌈XXX00111⌋ and ID0=⌈10000100⌋, ID0=⌈10000101⌋ and if ID0=⌈1000110⌋, respectively. If ID5=⌈XXX00111⌋ and ID0=⌈100010XX⌋ . . . ⌈11111XX⌋, the digital data can be discriminated to be data not defined in the present embodiment, such as computer data.

The video signal reproducing operation when the ID5 and ID0 have been detected as being ⌈XXX00111⌋ and ⌈10000100⌋, respectively, that is if the still picture video signals have been recorded under the still picture recording basic mode, is hereinafter explained.

If the digital signals have been discriminated as being still picture digital video signals, recorded under the still picture recording basic mode, system controller 52 then discriminates, based on the ID1, the attributes of digital video signals, that is the signal types, sampling frequency, whether data compression has been made, etc. For example the ID1=⌈XX000010⌋ indicates that the digital video signals are composed of luminance signals and chrominance signals, the sampling frequency is 910 fH, data compression has been effected and the recording is on the field-by-field basis.

The system controller 52 controls MUX 41 so that reproduced still picture data are supplied to the PCM processing circuit 33. The PCM processing circuit effects data correction of the still picture data supplied from MUX 41. The error-corrected compressed data are first stored in RAM 34. The still picture video processing circuit 31 effects data expansion on compressed data and-reproduces the video signals to supply the reproduced data to video RAM 32. The video RAM 32 stores the video signals by write addresses synchronized with data expansion by memory control let 53.

The system controller 52 controls the memory controller 53, at the time point when one-field video signals have been recorded in video RAM 32, so that the video signals are read out repeatedly. The video signals read out from video RAM 32 are supplied to still picture video processing circuit 31. The still picture video processing circuit 31 converts the video signals into video signals conforming to the NTSC system and subsequently sends out the converted signals to a monitor television receiver via changeover switch 27, D/A converter 23 and terminal 26. The result is that an image of the reproduced still picture is displayed on the monitor television receiver.

If, on the other hand, the digital video signals recorded on the magnetic tape 1 have not been processed by digital compression to attach emphasis on picture quality, and the recording is on the frame-by-frame basis, that is, if ID1=⌈XX000001⌋ has been detected, the above mentioned data compression is not effected, while repeated signal readout from video RAM 32 is started since the time point when one-frame video signals have been stored in video RAM 32.

Also, if the still picture video signals are recorded on the magnetic tape 1 under the still picture recording extension mode, that is if ID5 and ID0 have been detected as being ⌈XXX00111⌋ and ⌈10000101⌋, it is determined, based on the ID1, if the video signals have been recorded as luminance signals and chrominance signals or as RGB signals, while it is also determined if data compression with a compression ratio of ⅛ has been made. The still picture recording video signals are reproduced by an operation similar to the operation of the still picture recording basic mode.

The PCM audio signal reproducing operation when the ID5 has been detected as being ⌈XX11XX1⌋, that is if PCM audio signals have been recorded on the magnetic tape 1, is hereinafter explained.

When it is determined that PCM audio signal have been recorded on the magnetic tape 1, system controller 52 controls MUX 41 so that the PCM audio signals reproduced by the head unit 40 be transmitted via terminal 2 to a voice signal processing circuit, not shown, composed of e.g. a deinterleaving circuit, a decoder for effecting data expansion, and a D/A converter. The PCM audio signals are converted in a voice signal processing circuit into voice signals (analog signals). The result is that the voice is reproduced by e.g. a loudspeaker.

The operation when ID5, ID0 have been detected as being ⌈XXX00111⌋, ⌈10000110⌋, that is when still picture video signals have been recorded on the magnetic tape 1 under the still picture recording dedicated mode, is hereinafter explained.

When it is determined that the digital signals belonging to the still picture recording dedicated mode are recorded, the system controller 52 controls the still picture video signal processing unit 30 so that characters, for example, are generated for displaying on a monitor television receiver connected to terminal 2 that the recorded video signals belong to the still picture recording dedicated mode and cannot be reproduced by the VTR. The result is that the user may be apprised of the reason the digital signals cannot be reproduced.

Meanwhile, a plurality of light-emitting diodes may be connected to system controller 52 and thereby selectively control led to be turned on based on the ID5 and ID0 so that the user may be apprised of the mode to which belong the digital signals recorded on the magnetic tape 1.

As described above, when recording various digital signals, such as PCM audio signals, digital video signals of still pictures or digital video signals by computer graphics, in the PCM audio area of the magnetic tape 1, the IDs indicating to which of the modes, such as PCM audio signal recording mode, still picture recording mode, still picture recording extension mode or still picture recording extension mode belong the recorded digital signals may be recorded so that, during reproduction, it can be determined, based on these IDs, to which of the modes belong the recorded digital signals. For example, if the recorded signals are still picture digital video signals belonging to the still picture recording basic mode or still picture recording extension mode, video signals of the still picture are reproduced and outputted. On the other hand, if the mode is the still picture recording dedicated mode and cannot be reproduced by the reproducing apparatus, the user may be apprised of the fact that the signals belong to the still picture recording dedicated mode and hence reproduction cannot be made. The result is that the user may be apprised of the reason the playback cannot be made. In other words, by classifying the still picture video signals into the still picture recording basic mode, still picture recording extension mode or still picture recording dedicated mode, by recording ID5 for identifying these modes during recording the video signals, and by controlling the playback of the video signals based on these IDs, the user may be apprised of the reason the playback cannot be made, while the producer may freely add unique functions to make distinction from other producers products to develop products which will be attractive to the user.

A second embodiment of the present invention, in which, for further improving the sound quality in the conventional Hi-8 mm VTR, the present invention is applied to a video tape recorder capable of recording linearly quantized 16 bit/sample (referred to hereinafter as L mode) PCM audio signals or nonlinearly quantized 12 bit/sample (referred to hereinafter as N mode) PCM audio signals in the PCM audio range, referred to hereinafter as Hi-8 PCMVTR.

Although increased in frequency range of video signal recording as compared to the VTR of the preceding first embodiment, the present Hi-8 PCMVTR has a circuit arrangement similar thereto, so that the description of the circuit arrangement is not made and only the format of the PCM audio range adopted in the present Hi-8 PCMVTR and the ID are explained.

Figure 15:
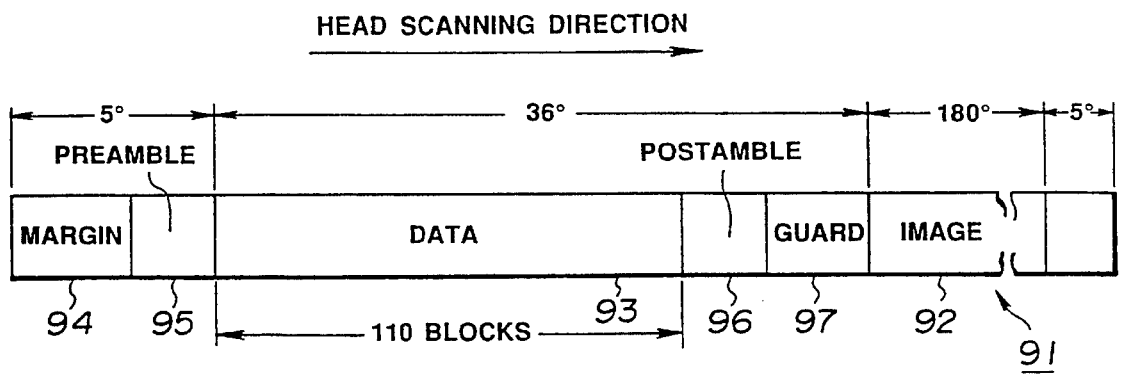
FIG. 15 shows a tape format of a magnetic tape employed in a Hi-8 mm video tape recorder.
Figure 16:
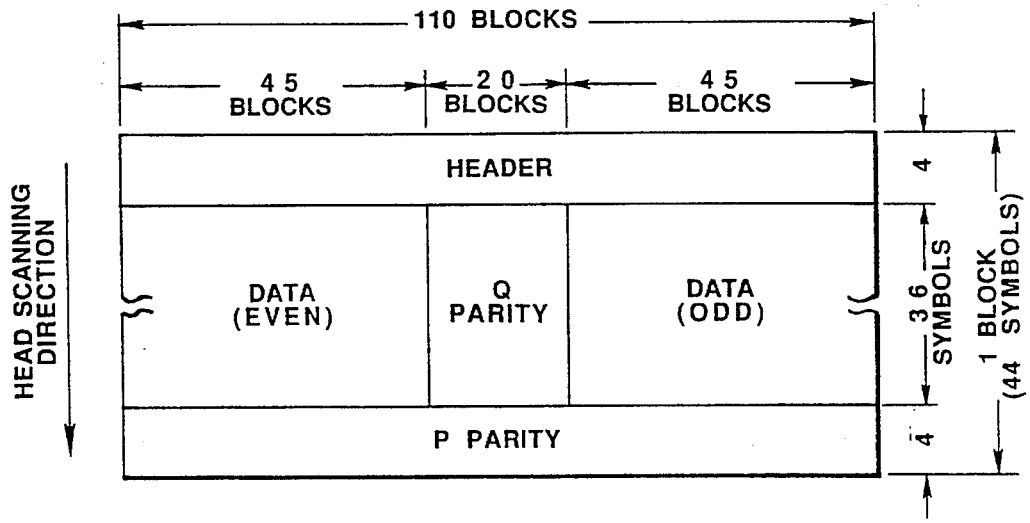
FIG. 16 shows a field format of a PCM audio area of the magnetic tape employed in the Hi-8 mm video tape recorder of FIG. 15.

A magnetic tape used in the Hi-8 PCMVTR has a tape format as shown in FIG. 15 and a format similar to a field format shown in FIG. 16. That is, obliquely extending tracks are formed by helical scanning of the rotary head, and a margin area, a preamble ares, a PCM audio area for recording PCM audio signals, a postamble area, guard area and a video area for recording video signals, are arrayed from the leading end of the track. Meanwhile, the lengths of the margin area and the preamble area summed together corresponds to rotation through 5° of the rotary head drum, while the lengths of the PCM audio area, post-amble area and the guard area summed together and the length of the video area correspond to rotation of the rotary head drum through 36° and 180°, respectively.

Figure 18:
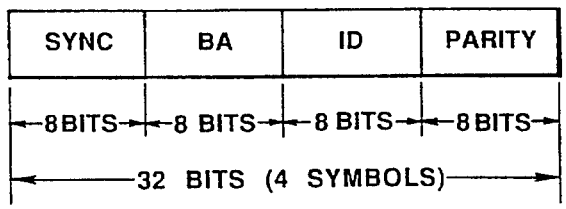
FIG. 18 shows a header format of a PCM audio area of the magnetic tape employed in the Hi-8 mm video tape recorder of FIG. 15.

The field format of the PCM audio area is such that, in the L mode of the NTSC system, for example, each track of the PCM audio area is composed of 110 blocks, in each of which 4-symbol or 4-byte header, 36 symbol data or parity and 4 symbol P parity are arrayed sequentially. Specifically, the format of the 36 symbol data is such that, similarly to the format shown in FIG. 17, each track has 3240 (=36 byte×90 blocks: $L_{0U}$ to $L_{809U}$, $L_{0L}$ to $L_{809L}$, $R_{0U}$ to $R_{809U}$, $R_{0L}$ to $R_{809L}$) byte data and 1160=4 bytes×110 blocks+36 bytes×20 blocks) byte parity are arrayed in each track. On the other hand, the format of the header is such that, similarly to the format shown in FIG. 18, synchronization signals, block address (BA), ID and parity, each consisting of 8 bits, are arrayed. Meanwhile, with the PAL system, each track is composed of 132 blocks. In the N mode with both systems, al though the number of blocks is the same as that with the L mode, the capacity of data recorded in each track is 27 symbols.

Figure 8:
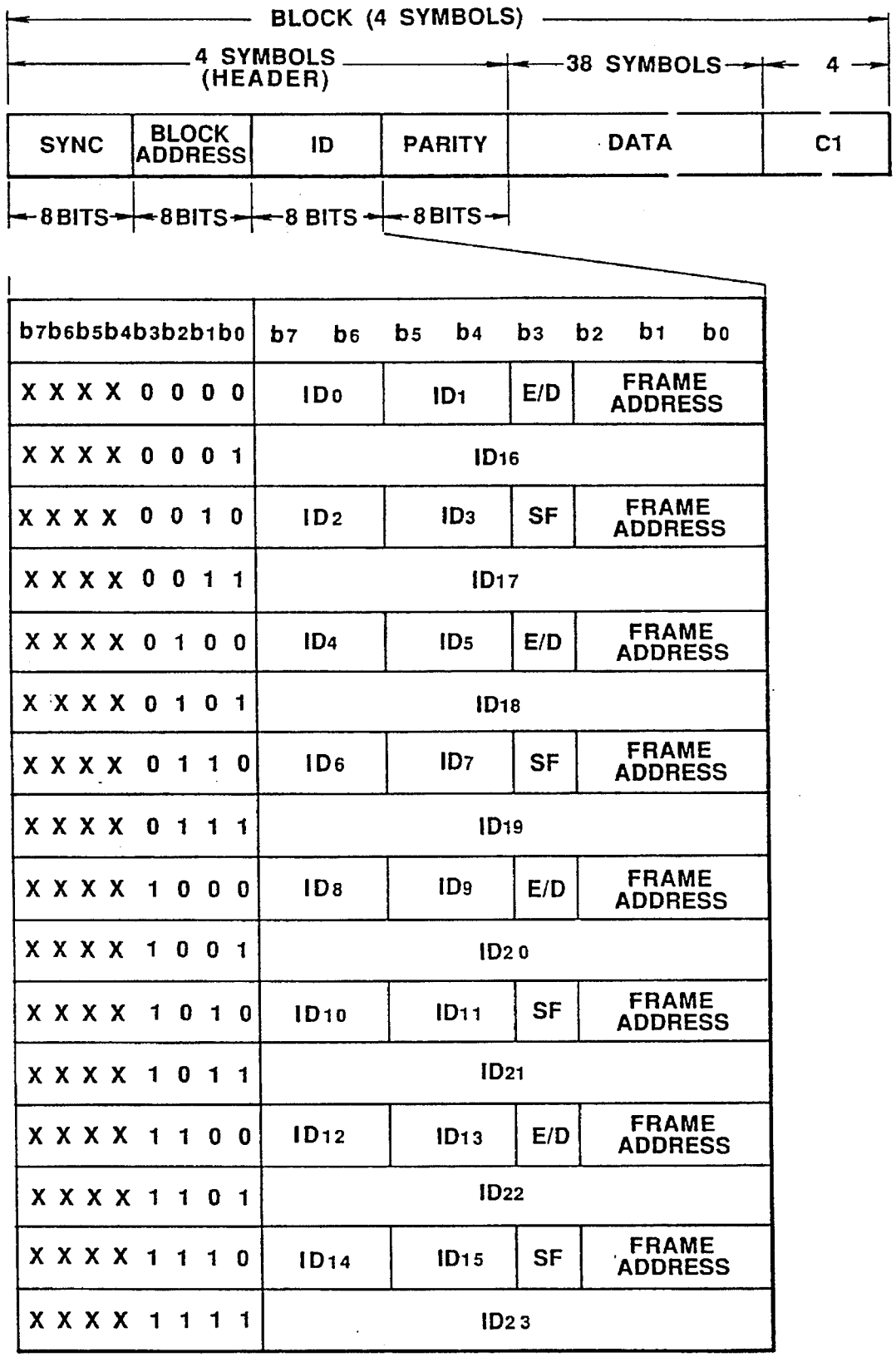
FIG. 8 shows an ID format adopted for use by a Hi-8 PCMVTR according to an embodiment of the present invention.

In the PCM audio area of the present Hi-8 PCMVTR having the above format, the ID format is such that, as shown for example in FIG. 8, 16 blocks are arranged as one unit, that is, the lower 4 bits ($b_3$ to $b_0$) of the block address of ⌈0000⌋ to ⌈1111⌋ of the block address as a unit, ID0 to ID15 are each composed of 2 bits and ID16 to ID23 are each composed of 8 bits, each two of the ID0 to ID15 are arrayed in one and the same block, and the IDs are arrayed in the order of ID0, ID1, ID16, ID2, ID3, ID17, ID4, ID5, ID18, ID6, ID7, ID19, ID8, ID9, ID20, ID10, ID11, ID21, ID12, ID13, ID22, ID14, ID15 and ID23.

Figure 9:
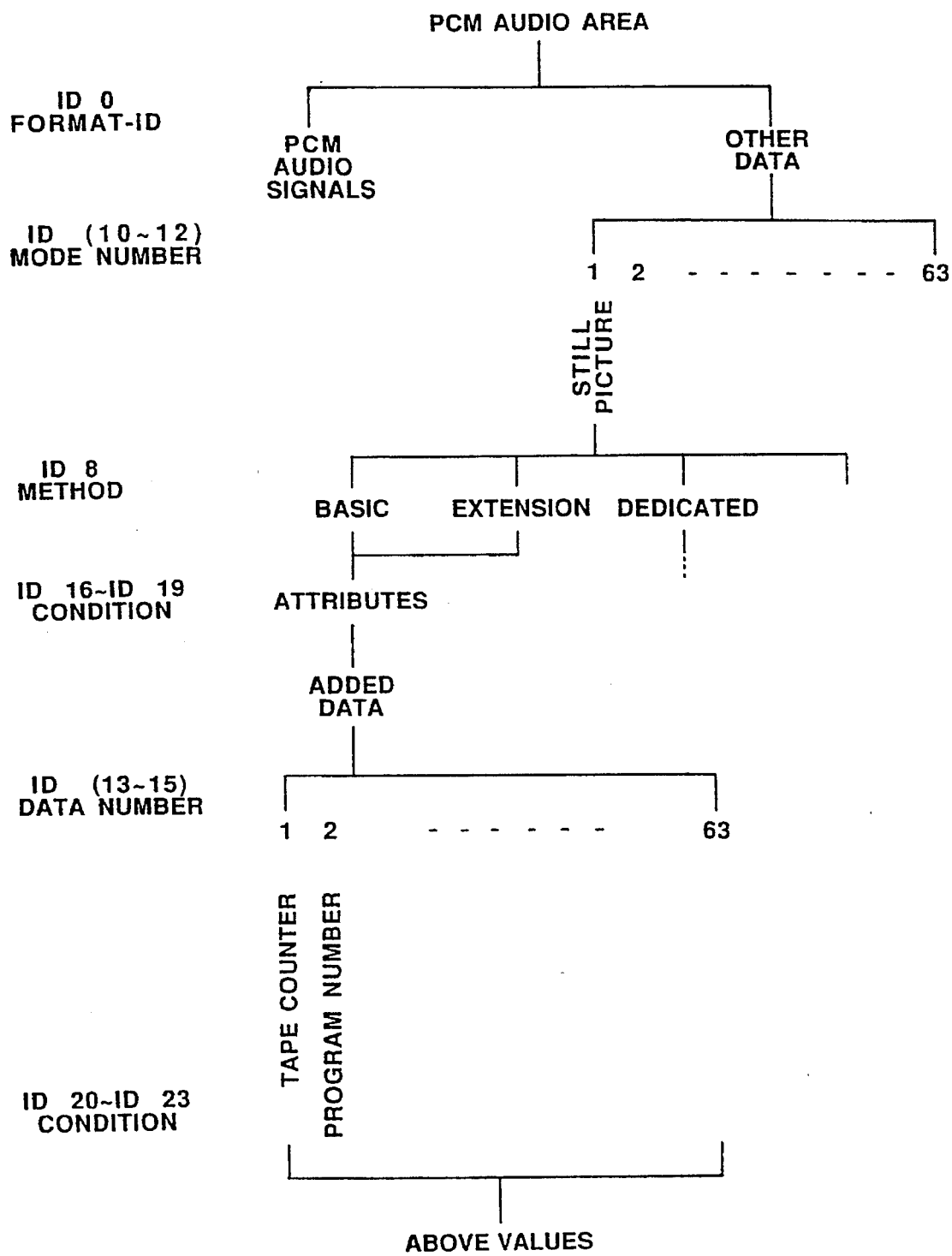
FIG. 9 shows a first example of an ID adopted for use by the Hi-8 PCMVTR.

Referring to FIG. 9, a first example of role allocation of the ID0 to ID23 is explained.

ID0 (Format-ID) is an identification code for discriminating the PCM audio signals recorded in the PCM audio area, referred to hereinafter as PCM audio signal recording mode, and other digital signals, referred to hereinafter as other data recording mode.

Since each of ID10 to ID12 (mode number) is composed of 2 bits, the total number of bits is 6, expressed hereinafter as ID [10 to 12]. This ID [10 to 12] is an identification code for discriminating, in e.g. the other data recording mode, the data types, such as digital video signals of a still picture recorded in the PCM audio area.

ID8 (Method) is an identification code for discriminating if the data recorded in the PCM audio area, such as the video signals of a still picture, belong to the basic function in which playback interchangeability is assured with VTRs of arbitrary producers, referred to hereinafter as still picture recording basic mode, an extended function, which is a mode advanced from the basic mode so that unidirectional interchangeability is assured, referred to hereinafter as a still picture recording extension mode, or to a dedicated function or system which is defined independently of the basic or extension functions and in which interchangeability is not assured with any of these functions, referred to hereinafter as still picture recording dedicated mode.

ID16 to ID19 (Condition) are values indicating, in the still picture recording basic mode and still picture recording extension mode, the attributes of the recorded digital signals, such as recording start and end positions of digital video signals, types of digital video signals, sampling frequencies, whether data compression has been made, etc., and additionally indicating, in the still picture recording dedicated mode, data types of digital video signals by e.g. computer graphics.

Since each of ID13 to ID15 (mode number) is composed of 2 bits, the total number of bits is 6, expressed hereinafter as ID[13 to 15]. This ID[13 to 15] is an identification code for discriminating the type of additional data, such as tape counter, recorded in ID20 to ID23.

ID20 to ID23 (Condition) is the value of the additional data. Specifically, ID0 is an identification code for discriminating the PCM audio signal recording mode, other data recording mode etc., as shown in Table 13, with ID0=⌈10⌋ indicating the other data recording mode.

TABLE 13

| Designation | Usage | Bit Allocation |
|---|---|---|
| I D 0 | Format-ID | 00 : Audio |
| | | 01 : Mulit Track Audio |
| | | 10 : Others |
| | | 11 : (reserved) |

In e.g. the other data recording mode (ID0=⌈10⌋), ID1 to ID7 are used for the following applications, as shown for example in Table 14.

TABLE 14

| Designation | Usage | Bit Allocation |
|---|---|---|
| I D 1 | (reserved) | |
| I D 2 | Sampling Frequency | 00 : 48kHz |
| | | 01 : (reserved) |
| | | 10 : (reserved) |
| | | 11 : (reserved) |
| I D 3 | (reserved) | |
| I D 4 | Quantization | 00 : 16bit |
| | | 01 : 12bit |
| | | 10 : (reserved) |
| | | 11 : (reserved) |
| I D 5 | (reserved) | |
| I D 6 | Digital Copy | 00 : Permitted |
| | | 01 : (reserved) |
| | | 10 : Prohibited |
| | | 11 : (reserved) |
| I D 7 | Edit Flag | 00 : Others |
| | | 01 : Edit Flag End |
| | | 10 : Edit Flag Start |
| | | 11 : (reserved) |

That is, ID2 is an identification code for discriminating the types of data formats, such that, for example, ID2=⌈00⌋ indicate a data format for PCM audio signals having the sampling frequency of 48 kHz.

ID4 is an identification code for discriminating the type of the data format, such that ID4=⌈00⌋ and ID4=⌈01⌋ indicate a format for L mode of the PCM audio signals and format for N mode of the PCM audio signals, respectively.

ID6 is an identification code for discriminating copy permit or not permit, such that ID6=⌈00⌋ or ID6=⌈10⌋ indicate copy permitted or copy not permitted, respectively.

ID7 is an identification code for discriminating the recording start point or recording end point, such that ID7=⌈10⌋ indicates the recording start point or recording mode change point and ID7=⌈01⌋ indicates recording end point etc.

Meanwhile, in the other data recording mode (ID0=⌈10⌋), ID1, ID3, ID5 and ID9 are not defined.

In the other data recording mode (ID0=⌈10⌋), ID[10 to 12] is a mode number for discriminating the types of the recorded digital signals, as shown in Table 15. For example, ID[10 to 12]=⌈000001⌋ indicates that the recorded digital signal belongs to the still picture digital video signal, referred to hereinafter as the still picture recording mode.

TABLE 15

| Designation | Usage | Bit Allocation | | | | | |
|---|---|---|---|---|---|---|---|
| I D 1 0 | Mode Number | ID10 | | ID11 | | ID12 | |
| I D 1 1 | | b7 | b6 | b5 | b4 | b7 | b6 |
| I D 1 2 | | MSB | . | . | . | . | LSB |

000000 : (reserved)
000001 : Still Video
000010 : (reserved)
. :
. :
111111 : (reserved)

In e.g. the still picture recording mode. (ID0=⌈10⌋, ID[10 to 12]=⌈000001⌋, ID8 is a system number for indicating the still picture recording basic mode, still picture recording extension mode or still picture recording dedicated mode, as shown for example in Table 16, such that ID8=⌈00⌋, ⌈01⌋, ⌈10⌋ indicate the still picture recording basic mode, still picture recording extension mode or still picture recording dedicated mode, respectively.

TABLE 16

| Designation | Usage | Bit Allocation |
| --- | --- | --- |
| I D 8 | Method | 00 : Basic System |
| | | 01 : Extended System |
| | | 10 : Dedicated System |
| | | 11 : (reserved) |

ID16 is composed of 8 bits ($b_7$ to $b_0$) and, in e.g. the still picture recording basic mode (ID0=⌈10⌋, ID[10 to 12]= ⌈000001⌋, ID8=⌈00⌋, the upper two bits ($b_7$, $b_6$) are identification codes for discriminating the start or end position of a track on which digital video signals are recorded, such that $b_7 \ldots b_6$=⌈01⌋, ⌈10⌋, ⌈11⌋ indicate the start position, end position and intermediate position, respectively. The two following bits ($b_5$, $b_4$) are identification codes for discriminating the types of digital video signals, such that $b_5 \ldots b_4$=⌈00⌋ indicate luminance and chrominance signals. The two following bits ($b_3$, $b_2$) are identification codes for discriminating the types of the sampling frequencies of digital video signals, such that $b_3 \ldots b_2$=⌈00⌋, ⌈01⌋ indicate 910 fH and 1365 fH. The next following bit ($b_1$) is an identification code for discriminating if data compression has been made on the digital video signals, such that $b_1$=⌈1⌋ indicates that data compression has been made on digital video signals. The lower most bit ($b_0$) is an identification code for discriminating whether the still picture video signals have been recorded on the frame-by-frame basis or on the field-by-field basis, such that $b_0$=⌈0⌋ or ⌈1⌋ indicates the former and the latter, respectively.

TABLE 17

| Designation | Usage | Bit Allocation | | |
| --- | --- | --- | --- | --- |
| I D 1 6 | Condition | $b_7$ | $b_6$: | Data Start/End Point |
| | | 0 | 1: | Start Point |
| | | 1 | 0: | End Point |
| | | 1 | 1: | between Start and End |
| | | 0 | 0: | (reserved) |
| | | $b_5$ | $b_4$: | Data Contents |
| | | 0 | 0: | Y, chrominance |
| | | 0 | 1: | (reserved) |
| | | 1 | 0: | (reserved) |
| | | 1 | 1: | (reserved) |
| | | $b_3$ | $b_2$: | Sampling Frequency |
| | | 0 | 0: | Corresp. to 910fH |
| | | 0 | 1: | Corresp. to 1365fH |
| | | 1 | 0: | (reserved) |
| | | 1 | 1: | (reserved) |
| | | $b_1$: | | Compression |
| | | 0: | | OFF |
| | | 1: | | ON |
| | | $b_0$: | | Field/Frame |
| | | 0: | | Field |
| | | 1: | | Frame |

On the other hand, in e.g. the still picture recording extension mode (ID0=⌈10⌋, ID[10 to 12]=⌈000001⌋, ID8= ⌈01⌋), the upper two bits of ID16 ($b_7$, $b_6$) are identification codes for discriminating the start or end position of the track in which the digital video signals are recorded, as shown in Table 18, as in the above mentioned still picture recording basic mode. The two following bits ($b_5$, $b_4$) are identification codes for discriminating the types of digital video signals, such that $b_5 \ldots b_4$=⌈00⌋ indicate luminance, chrominance signals or RGB signals. The two following bits ($b_3$, $b_2$) are identification codes for discriminating the types of the sampling frequencies of digital video signals, as in the above mentioned still picture recording basic mode. The next following bit ($b_1$) is an identification code for discriminating the type of data compression, such that $b_1$=⌈0⌋ indicates the compression factor of ⅛ in ADRC. The lower most bit ($b_0$) is an identification code for discriminating whether the still picture video signals have been recorded on the frame-by-frame basis or on the field-by-field basis, as in the above mentioned still picture recording basic mode.

TABLE 18

| Designation | Usage | Bit Allocation | | |
| --- | --- | --- | --- | --- |
| I D 1 6 | Condition | $b_7$ | $b_6$: | Data Start/End Point |
| | | 0 | 1: | Start Point |
| | | 1 | 0: | End Point |
| | | 1 | 1: | between Start and End |
| | | 0 | 0: | (reserved) |
| | | $b_5$ | $b_4$: | Data Contents |
| | | 0 | 0: | Y, chrominance |
| | | 0 | 1: | R, G, B |
| | | 1 | 0: | (reserved) |
| | | 1 | 1: | (reserved) |
| | | $b_3$ | $b_2$: | Sampling Frequency |
| | | 0 | 0: | Corresp. to 910fH |
| | | 0 | 1: | Corresp. to 1365fH |
| | | 1 | 0: | (reserved) |
| | | 1 | 1: | (reserved) |
| | | $b_1$: | | Compression |
| | | 0: | | ⅛ |
| | | 1: | | (reserved) |
| | | $b_0$: | | Field/Frame |
| | | 0: | | Field |
| | | 1: | | Frame |

On the other hand, in e.g. the still picture recording dedicated mode (ID0=⌈10⌋, ID[10 to 12]=⌈000001⌋, ID8= ⌈10⌋), the upper 6 bits ($b_7 \ldots b_2$) of ID16 are category numbers for discriminating video signals other than the still picture video signals in the still picture recording basic mode and still picture recording extension mode, such that digital video signals by computer graphics, such that $b_7 \ldots b_2$= ⌈000001⌋ indicate video signals by computer graphics. The remaining two bits ($b_1$, $b_0$) are identification codes for discriminating the start or end positions of the track in which digital video signals have been recorded.

TABLE 19

| Designation | Usage | Bit Allocation | | | | | | |
| --- | --- | --- | --- | --- | --- | --- | --- | --- |
| I D 1 6 | Category Number & Data Start/ End Point | $b_7$ | $b_6$ | $b_5$ | $b_4$ | $b_3$ | $b_2$: | Category Number |
| | | 0 | 0 | 0 | 0 | 0 | 0: | (reserved) |
| | | 0 | 0 | 0 | 0 | 0 | 1: | Computer Graphics |
| | | 0 | 0 | 0 | 0 | 1 | 0: | (reserved) |
| | | . | | | | | | |
| | | 1 | 1 | 1 | 1 | 1 | 1: | (reserved) |
| | | $b_1$ | $b_0$: | Data Start/End Point | | | | |
| | | 0 | 1: | Start Point | | | | |
| | | 1 | 0: | End Point | | | | |
| | | 1 | 1: | between Start and End | | | | |
| | | 0 | 0: | (reserved) | | | | |

ID17 ... ID19 are each composed of 8 bits ($b_7 \ldots b_0$), such that, in e.g. the still picture recording basic mode and still picture recording extension mode (ID0=⌈10⌋, ID[10 to 12]=⌈000001⌋, ID8=⌈0X⌋, the upper four bits ($b_7 \ldots b_4$) of ID17, the upper four bits ($b_7 \ldots b_4$) of ID18 and the lower four bits ($b_3 \ldots b_0$) of ID18 indicate the values of hundreds, tens and units of the block number indicating the numbers of the blocks necessary in recording a still picture. The bit ($b_3$) among the lower four bits of ID17 is an identification number for discriminating whether digital video signals of the still picture has been recorded (+) or not (−), while two bits ($b_2$, $b_1$) are identification codes for discriminating validity of the digital video signals. ID19 is a frame number which is incremented by one for each picture frame.

TABLE 20

| Designation | Usage | Bit Allocation |
|---|---|---|
| ID 17 | Data Block Number | $b_7$ $b_6$ $b_5$ $b_4$: (×100)<br>0 0 0 0<br>0 0 0 1<br>.<br>.<br>.<br>1 0 0 1<br>$b_3$: (+/−)<br>0: +<br>1: −<br>$b_2$ $b_1$: Data Valid<br>0 0: Valid Data<br>0 1: (reserved)<br>1 0: (reserved)<br>1 1: (reserved)<br>$b_0$: (reserved) |
| ID 18 | Data Block Number | $b_7$ $b_6$ $b_5$ $b_4$: (×10)<br>0 0 0 0<br>0 0 0 1<br>.<br>.<br>.<br>1 0 0 1<br>$b_3$ $b_2$ $b_1$ $b_0$: (×1)<br>0 0 0 0<br>0 0 0 1<br>.<br>.<br>.<br>1 0 0 1 |
| ID 19 | Frame Number | $b_7$ $b_6$ $b_5$ $b_4$ $b_3$ $b_2$ $b_1$ $b_0$<br>0 0 0 0 0 0 0 0<br>0 0 0 0 0 0 0 1<br>.<br>.<br>.<br>1 1 1 1 1 1 1 1 |

On the other hand, in e.g. the still picture recording dedicated mode (ID0=⌈10⌋, ID[10 to 12]=⌈000001⌋, ID8=⌈10⌋), the upper two bits ($b_7$, $b_6$) of ID17 are identification codes for discriminating the types of digital video signals, such as RGB signals, signals by B&W or signals by CLUT, such that $b_7 \ldots b_6$=⌈00⌋, ⌈01⌋, ⌈10⌋ indicate the RGB signals, signals by B&W or signals by CLUT, respectively, as shown in Table 21. In the case of the RGB signals and signals by B&W, the two following bits ($b_5$, $b_4$) are identification codes for discriminating the numbers of bits per pixel, such that $b_5 \ldots b_4$=⌈00⌋, ⌈01⌋, ⌈10⌋ indicate 8 bits, 4 bits or 1 bit, respectively. The two following bits ($b_3$, $b_2$) are identification codes for discriminating the types of resolution of a picture, such that $b_3 \ldots b_2$=⌈00⌋ indicates 480×640 pixels. The remaining two bits ($b_1$, $b_0$) are identification codes for discriminating the types of the screen size, such that $b_1 \ldots b_0$=⌈00⌋, ⌈01⌋, ⌈10⌋ indicate the full size, ½ size and ¼ size, respectively.

TABLE 21

| Designation | Usage | Bit Allocation |
|---|---|---|
| ID 17 | Condition | $b_7$ $b_6$: Data Contents<br>0 0: R, G, B<br>0 1: B&W<br>1 0: CLUT<br>1 1: (reserved)<br>$b_5$ $b_4$: Quantization |

TABLE 21-continued

| Designation | Usage | Bit Allocation |
|---|---|---|
| | | $b_7 b_6$=0X     $b_7 b_6$=10<br>0 0: 8bit     (reserved)<br>0 1: 4bit     (reserved)<br>1 0: 1bit     (reserved)<br>1 1: (reserved)     (reserved)<br>$b_3$ $b_2$: Resolution<br>0 0: 480 × 640 pixels<br>0 1: (reserved)<br>1 0: (reserved)<br>1 1: (reserved)<br>$b_1$ $b_0$: Size<br>0 0: Full<br>0 1: ½<br>1 0: ¼<br>1 1: (reserved) |

On the other hand, in e.g. the still picture recording dedicated mode (ID0=⌈10⌋, ID[10 to 12]=⌈000001⌋, ID8=⌈10⌋), the upper four bits ($b_7 \ldots b_4$) of ID18, the upper four bits ($b_7 \ldots b_4$) of ID19 and the lower four bits ($b_3 \ldots b_0$) of ID19 indicate the values of hundreds, tens and units of the block number indicating the numbers of the blocks necessary in recording a still picture. The bit ($b_3$) among the lower four bits of ID18 is an identification code for discriminating whether digital video signals of the still picture has been recorded (+) or not (−), while two bits ($b_2$, $b_1$) are identification codes for discriminating validity of the digital video signals.

TABLE 22

| Designation | Usage | Bit Allocation |
|---|---|---|
| ID 18 | Data Block Number | $b_7$ $b_6$ $b_5$ $b_4$: (×100)<br>0 0 0 0<br>0 0 0 1<br>.<br>.<br>.<br>$b_3$: (+/−)<br>0: +<br>1: −<br>$b_2$ $b_1$: Data Valid<br>0 0: Valid Data<br>0 1: (reserved)<br>1 0: (reserved)<br>1 1: (reserved)<br>$b_0$: (reserved) |
| ID 19 | Data Block Number | $b_7$ $b_6$ $b_5$ $b_4$: (×10)<br>0 0 0 0<br>0 0 0 1<br>.<br>.<br>.<br>1 0 0 1<br>$b_3$ $b_2$ $b_1$ $b_0$: (×1)<br>0 0 0 0<br>0 0 0 1<br>.<br>.<br>.<br>1 0 0 1 |

In e.g. the still picture recording mode (ID0=⌈10⌋, ID[10 to 12]=⌈000001⌋), ID[13 . . . 15] is an identification code for discriminating the type of the added data recorded in ID20 to ID23, as shown for example in Table 23, such that ID[13 . . . 15]=⌈000001⌋, ⌈000010⌋, ⌈000011⌋, ⌈000100⌋, ⌈000101⌋, ⌈000110⌋ indicate the tape counter, program number 1, data, time, program number 2 and index, respectively.

TABLE 23

| Designation | Usage | Bit Allocation | | | | | |
|---|---|---|---|---|---|---|---|
| ID13<br>ID14<br>ID15 | Data Number | ID13 | | ID14 | | ID15 | |
| | | b5 | b4 | b7 | b6 | b5 | b4 |
| | | MSB | . | . | . | . | LSB |

With the present Hi-8 PCMVTR, similarly to the VTR of the first embodiment, video signals of the moving pictures are recorded in a video area and voice signals as well as video signals of the still picture are recorded as digital signals in the PCM audio area, at the same time that the types of the digital signals recorded in the PCM audio area, such as voice signals, video signals etc. or attributes thereof, such as the sampling frequency, whether or not data compression has been made etc. are recorded as IDs in a predetermined region of the PCM audio area. Also the video signals of the moving pictures recorded in the video area are reproduced, at the same time that the types or attributes of the digital signals recorded in the video area are determined based on the IDs for controlling the playback of the voice signals, video signals etc. in conformity to these types or attributes.

For example, if the digital video signals of the still picture are to be recorded, the digital video signals are composed of luminance signals and chrominance signals, the sampling frequency is 910 fH, data compression is performed to prefer the time necessary for recording, and the recording is on the field-by-field basis, that is in the still picture recording basic mode, the digital video signals are recorded in the above mentioned $L_{0U}$ to $L_{809U}$, $L_{0L}$ to $L_{809L}$, $R_{0U}$ to $R_{809U}$, $R_{0L}$ to $R_{809L}$) of the PCM audio area, while the recorded IDs are such that ID0=⌈10⌋, ID2=⌈00⌋, ID4=⌈0X⌋, X indicating the L mode, N mode, ID6=⌈X0⌋, X indicating copy permit for digital signals, ID7=⌈XX⌋, X indicating the recording start position etc, ID8=⌈00⌋, ID[10 . . . 12]=⌈000001⌋, ID16=⌈XX000010⌋, X indicating the recording start position etc. of digital video signals, ID17=⌈XXXX000X⌋, X indicating the value of the hundreds of the block number, ID18=⌈XXXXXXXX⌋, X indicating the values of the hundreds and units of the block number, ID19=⌈XXXXXXX⌋, X indicating the repetition of 0 to 255 on the picture frame basis, ID[13 . . . 15]=⌈XXXXXX⌋, X indicating the type of the additional data, and ID20 . . . ID23=⌈XXXXXXXX⌋, X indicating the value of the additional data.

If the digital picture signals are composed of RGB signals, the sampling frequency is 910 fH, data compression is performed at a rate of ⅛ for reducing the time necessary for recording, and the recording is on the field-by-field basis, that is in the still picture recording extension mode, the digital video signals are recorded in the above mentioned $L_{0U}$ to $L_{809U}$, $L_{0L}$ to $L_{809L}$, $R_{0U}$ to $R_{809U}$, $R_{0L}$ to $R_{809L}$ of the PCM audio area, while the recorded IDs are such that ID0=⌈10⌋, ID2=⌈00⌋, ID4=⌈0X⌋, X indicating the L mode, N mode, ID6=⌈X0⌋, X indicating copy permit for digital signals, ID7=⌈XX⌋, X indicating the recording start position etc., ID8=⌈01⌋, ID[10 . . . 12]=⌈000001⌋, ID16=⌈XX010010⌋, X indicating the recording start position etc. of digital video signals, ID17=⌈XXXX000X⌋, X indicating the value of the hundreds of the block number, ID18=⌈XXXXXXXX⌋, X indicating the values of the hundreds and units of the block number, ID19=⌈XXXXXXX⌋, X indicating the repetition of 0 to 255 on the picture frame basis, ID[13 . . . 15]=⌈XXXXXX⌋, X indicating the type of the additional data, and ID20 . . . ID23=⌈XXXXXXXX⌋, X indicating the value of the additional data.

On the other hand, if the digital video signals are data by CLUT, the pixel data are 8-bit data, the resolution is 480× 640 pixels, and the screen size is the full screen size, data by CLUT are recorded in the above mentioned. $L_{0U}$ to $L_{809U}$, $L_{0L}$ to $L_{809L}$, $R_{0U}$ to $R_{809U}$, $R_{0L}$ to $R_{809L}$) of the PCM audio area, while the recorded IDs are such that ID0=⌈10⌋, ID2=⌈00⌋, ID4=⌈0X⌋, X indicating the L mode, N mode, ID6=⌈X0⌋, X indicating copy permit for digital signals, ID7=⌈XX⌋, X indicating the recording start position etc., ID8=⌈10⌋, ID[10 . . . 12]=⌈000001⌋, ID16=⌈000001XX⌋, X indicating the recording start position etc. of digital video signals, ID17=⌈10XX0000⌋, ID18=⌈XXXX000X⌋, X indicating the value of the hundreds of the block number, ID19=⌈XXXXXXXX⌋, X indicating the values of the tens and units of the block number, ID[13 . . . 15]=⌈XXXXXX⌋, X indicating the type of the additional data, and ID20 . . . ID23=⌈XXXXXXXX⌋, X indicating the value of the additional data.

If, for example, PCM audio signals are recorded, the PCM audio signals have been sampled with the sampling frequency of 48 kHz and are PCM audio stereo signals by 16-bit linear quantization (L mode), so-called emphasis processing is not carried out, and the copy at the digital signals is permitted, the PCM audio signals are recorded in $L_{0U}$ to $L_{809U}$, $L_{0L}$ to $L_{809L}$, $R_{0U}$ to $R_{809U}$, $R_{0L}$ to $R_{809L}$) of the PCM audio area, while the recorded IDs are such that ID0=⌈00⌋, ID1=⌈00⌋, ID2=⌈00⌋, ID3=⌈00⌋, ID4=⌈00⌋, ID5=⌈01⌋, ID6=⌈00⌋ and ID7=⌈XX⌋, X indicating the recording start position etc.

With the present H-8 PCMVTR, similarly to the first embodiment, playback of the digital signals recorded in the PCM audio area, such as PCM audio signals or still picture video signals, is controlled based on the above mentioned IDs.

For example, it is determined, on the basis of the IDs, to which mode belong the digital signals recorded in the PCM audio area, that is, it is determined whether the digital signals are PCM audio signals belonging to the PCM audio signal recording mode, the video signals belonging to the still picture recording basic mode, video signals belonging to the still picture extension mode, or video signals belonging to the still picture recording dedicated mode. If the digital signals belong to the PCM audio signal recording mode, still picture recording basic mode and still picture recording extension mode, they are reproduced. If the digital signals are video signals belonging to the still picture recording dedicated mode, the user is apprised of the fact that the corresponding playback function is not provided and the digital signals recorded in the PCM audio area belong to the still picture recording dedicated mode.

Specifically, it may be discriminated that, if ID0=⌈00⌋, the digital signals are PCM audio signals belonging to the PCM audio signal recording mode, whereas, if ID=⌈10⌋, the digital data are data belonging to the other data recording mode and, if ID[10 . . . 12]=⌈00000⌋, the digital signals are the video signals belonging to the still picture recording mode. In the still picture recording mode, for example, it may be discriminated that, if ID8=⌈00⌋, the digital signals are digital signals belonging to the still picture recording basic mode, whereas, if ID8=⌈01⌋ or ⌈10⌋, the digital signals belong to the still picture recording extension mode or to the still picture recording dedicated mode, respectively.

If, for example, ID0=⌈10⌋, ID[10 . . . 12]=⌈000001⌋, ID8=⌈0X⌋ (still picture recording basic mode and still picture recording extension mode) is detected, the attributes of the digital video signals, that is the kinds of the digital video signals, sampling frequency and whether or not data compression has been made, are determined on the basis of ID2, ID4 and ID16. If, for example, ID2=⌈00⌋, ID4=⌈00⌋ and ID16=⌈XX000010⌋, the format of the digital video signals is determined to be such that the sampling frequency of the PCM audio signals is 48 kHz and L mode, the digital video signals are luminance signals and chrominance signals, the sampling frequency is 910 fH, data compression has been made, and the recording is on the field-by-field basis. The video signals are reproduced based on the attributes of the discriminated digital video signals.

On the other hand, if it is detected that ID0=⌈10⌋, ID[10 . . . 12]=⌈000001⌋ and ID8=⌈10⌋ (still picture recording dedicated mode), it is determined that playback cannot be made with the present Hi-8 PCMVTR and the user is apprised of the fact that the recorded digital signals belong to the still picture recording dedicated mode and playback cannot be made with this Hi-8 PCMVTR, as in the case of the first embodiment.

It is to be noted that the present invention is not limited to the above embodiments. For example, it may be applied to a video tape recorder in which a so-called deep-layer recording system having recording regions divided along the thickness of a magnetic tape and in which analog video signals and digital signals are recorded and/or reproduced in or from these regions, or to an optical disc apparatus for recording and/or reproducing various data.

It will be seen from above that the present invention provides an arrangement in which digital signals are divided into those belonging to the basic function and those belonging to the dedicated function, identification codes for discriminating if the digital signals being recorded belong to the basic function or to the dedicated function are recorded during recording of the digital signals, and playback of the digital signals is controlled based on these identification codes, so that the user may be apprised of the reason the playback cannot be made, whilst the producer may be free to add unique functions in future to make distinction from other producer's products to develop products attractive to customers.

We claim:

1. A recording and/or reproducing apparatus for recording and/or reproducing video signals representing motion pictures and digital signals representing PCM audio and/or still pictures in respective regions of each of a plurality of tracks on a magnetic tape, comprising:

helical scan recording means for recording video signals representing motion pictures and digital signals representing PCM audio and/or still pictures in corresponding regions on a magnetic tape;

discrimination code recording means for recording a discrimination code on said magnetic tape, said discrimination code indicating whether said digital signals represent PCM audio or still pictures recorded in a basic operating mode such that any of a predetermined group of reproducing devices is able to reproduce said still pictures, or in the alternative, still pictures recorded in a further operating mode such that at least one, but fewer than all, of the predetermined group of reproducing devices is able to reproduce said still pictures;

reproducing means for reproducing video signals representing motion pictures and digital signals representing PCM audio and/or still pictures recorded in respective regions on a selected magnetic tape;

discrimination code reproducing means for reproducing a discrimination code recorded on said selected magnetic tape, the reproduced discrimination code indicating whether said digital signals recorded on said selected magnetic tape were recorded in a basic operating mode such that any of said predetermined group of reproducing devices is able to reproduce the still pictures represented by the digital signals recorded on said selected magnetic tape or whether said digital signals recorded on said selected magnetic tape, were recorded in a further operating mode such that at least one, but fewer than all, of the predetermined group of reproducing devices is able to reproduce the still pictures represented by the digital signals recorded on said selected magnetic tape;

reproduction mode determining means for carrying out a determination of whether the recorded digital signals represent PCM audio, still pictures recorded in the basic operating mode, or still pictures recorded in the further operating mode, based on the discrimination code reproduced by said discrimination code reproducing means; and controlling means for controlling said reproducing means in response to said reproduction mode determining means so that said reproducing means reproduces the digital signals recorded on said selected magnetic tape.

2. The apparatus of claim 1, further comprising indicating means for indicating to a user when said reproducing means is not provided with an operating mode for reproducing said digital signals representing still pictures recorded on said selected magnetic tape, based on the determination carried out by the reproduction mode determining means.

3. The apparatus of claim 1, further comprising means for selectively controlling said helical scan recording means to record a selected one of said digital signals representing still pictures and PCM audio.

4. The apparatus of claim 1, further comprising means for selectively controlling said reproducing means to reproduce a selected one of said digital signals representing still pictures and PCM audio.

5. The apparatus of claim 1, wherein said digital signals representing still pictures include signals representing an optical image.

6. The apparatus of claim 1, wherein said digital signals representing still pictures include computer graphics data formed by a computer.

7. The apparatus of claim 1, wherein said reproducing means is operable to reproduce the digital signals representing still pictures in the basic operating mode when it exhibits operability to reproduce the digital signals representing still pictures in the further operating mode.

8. The apparatus of claim 1, wherein said reproducing means is operative to reproduce digital video still picture signals from said digital signals recorded on said selected magnetic tape in said basic operating mode, and to reproduce computer graphics data from said digital signals recorded on said selected magnetic tape in said further operating mode.

9. A digital signal recording and/or reproducing apparatus comprising:

digital signal recording means for recording digital signals on a recording medium;

discrimination code recording means for recording a discrimination code in a predetermined region of said recording medium, said discrimination code indicating whether said digital signals are being recorded by said digital signal recording means in a basic operating mode such that any of a predetermined group of reproducing devices is able to reproduce said digital signals or, in the alternative, in a further operating mode such that at least one, but fewer than all, of the predetermined group of reproducing devices is able to reproduce said digital signals;

digital signal reproducing means for reproducing digital signals recorded on a selected recording medium;

discrimination code reproducing means for reproducing a discrimination code recorded in a predetermined region of said selected recording medium, the reproduced discrimination code indicating whether said digital signals recorded on said selected recording medium were recorded in a basic operating mode such that any of said predetermined group of reproducing devices is able to reproduce the digital signals recorded on the selected recording medium, or in the alternative, in a further operating mode such that at least one, but fewer than all, of the predetermined group of reproducing devices is able to reproduce the digital signals recorded on the selected recording medium;

said digital signal reproducing means being operable to reproduce the digital signals recorded in the basic operating mode and to reproduce the digital signals recorded in the further operating mode;

reproduction mode determining means for carrying out a determination based on the discrimination code reproduced by said discrimination code reproducing means, of whether the digital signals have been recorded on said selected recording medium in the basic operating mode or the further operating mode, said reproduction mode determining means serving to produce a reproduction mode signal based on said determination;

controlling means for controlling said digital signal reproducing means to reproduce the digital signals recorded on the selected recording medium according to the determination carried out by said reproduction mode determining means; and indicating means for indicating to a user when said digital signal reproducing means is not provided with an operating mode for reproducing said digital signals recorded on said selected recording medium based on the reproduction mode signal produced by the reproduction mode determining means.

10. The apparatus of claim 9, wherein said digital signal reproducing means is operative to reproduce digital video still picture signals under the control of the controlling means when the reproduction mode determining means determines that the digital signals recorded on said selected recording medium have been recorded in the further operating mode.

11. The apparatus of claim 10, wherein said digital signal reproducing means is operative to reproduce digital video still picture signals under the control of the controlling means when the reproduction mode determining means determines that the digital signals recorded on said selected recording medium have been recorded in the basic operating mode.

12. The apparatus of claim 9, wherein said digital signal reproducing means is operative to reproduce digital video still picture signals under the control of the controlling means when the reproduction mode determining means determines that the digital signals recorded on said selected recording medium have been recorded in the basic operating mode, and to reproduce computer graphics data formed by a computer under the control of the controlling means when the reproduction mode determining means determines that the digital signals recorded on said selected recording medium have been recorded in the further operating mode.

* * * * *